United States Patent
Laroia et al.

(10) Patent No.: US 9,979,878 B2
(45) Date of Patent: May 22, 2018

(54) INTUITIVE CAMERA USER INTERFACE METHODS AND APPARATUS

(71) Applicant: THE LIGHTCO INC., Palo Alto, CA (US)

(72) Inventors: Rajiv Laroia, Far Hills, NJ (US); Sapna A Shroff, Sunnyvale, CA (US)

(73) Assignee: Light Labs Inc., Palo Alto, CA (US)

( * ) Notice: Subject to any disclaimer, the term of this patent is extended or adjusted under 35 U.S.C. 154(b) by 0 days. days.

(21) Appl. No.: 14/628,209

(22) Filed: Feb. 20, 2015

(65) Prior Publication Data

US 2015/0244927 A1 Aug. 27, 2015

Related U.S. Application Data

(60) Provisional application No. 61/943,299, filed on Feb. 21, 2014.

(51) Int. Cl.
*H04N 5/262* (2006.01)
*H04N 5/232* (2006.01)
(Continued)

(52) U.S. Cl.
CPC ........ *H04N 5/23216* (2013.01); *F16M 13/04* (2013.01); *G03B 17/561* (2013.01);
(Continued)

(58) Field of Classification Search
CPC .................................................. H04N 5/23216
See application file for complete search history.

(56) References Cited

U.S. PATENT DOCUMENTS 4,890,133 A  12/1989  Ogawa et al.
5,078,479 A  1/1992  Vuilleumier
(Continued)

FOREIGN PATENT DOCUMENTS

EP  2642757 A2  9/2013
JP  10091765  4/1998
(Continued)

OTHER PUBLICATIONS

"Focal length"; Wikipedia.org; Sep. 18, 2012.*
(Continued)

*Primary Examiner* — Gary C Vieaux
(74) *Attorney, Agent, or Firm* — Straub & Straub; Michael P. Straub; Stephen T. Straub

(57) ABSTRACT

Zoom and focus control user interface methods and apparatus are described. Acceleration is monitored and interpreted to detect camera motion. Acceleration indicative of camera motion in a forward or backward direction is used to control zoom in or zoom out operations when a zoom function is enabled. The zoom function can be enabled by touching a touch sensor or pressing a button. Thus, by activating the zoom function and making intuitive movements forward or backward which can be detected through the use of sensors, a user can control zoom in and zoom out operations in an intuitive manner with little risk of shaking the camera or interfering with image capture that might occur if a touch display or other zoom control was used to control zoom operation while capturing one or more images. The zoom control function is well suited for use with still cameras and video cameras.

14 Claims, 24 Drawing Sheets

(51) Int. Cl.
*F16M 13/04* (2006.01)
*H04N 5/225* (2006.01)
*G03B 17/56* (2006.01)

(52) U.S. Cl.
CPC ......... *G03B 17/563* (2013.01); *H04N 5/2254* (2013.01); *H04N 5/2258* (2013.01); *H04N 5/23212* (2013.01); *H04N 5/23245* (2013.01); *H04N 5/23258* (2013.01); *H04N 5/23296* (2013.01); *G03B 2217/005* (2013.01)

(56) References Cited

U.S. PATENT DOCUMENTS

| | | | |
|---|---|---|---|
| 5,153,569 A | 10/1992 | Kawamuraa et al. | |
| 5,353,068 A | 10/1994 | Moriwake | |
| 5,583,602 A * | 12/1996 | Yamamoto | G02B 7/28 396/133 |
| 5,598,207 A | 1/1997 | Kormos et al. | |
| 5,781,331 A | 7/1998 | Carr et al. | |
| 5,889,553 A | 3/1999 | Kino et al. | |
| 5,975,710 A | 11/1999 | Luster | |
| 5,982,951 A | 11/1999 | Katayama et al. | |
| 6,011,661 A | 1/2000 | Weng | |
| 6,028,600 A | 2/2000 | Rosin et al. | |
| 6,081,670 A | 6/2000 | Madsen et al. | |
| 6,141,034 A | 10/2000 | McCutchen | |
| 7,009,652 B1 | 3/2006 | Tanida et al. | |
| 7,280,735 B2 | 10/2007 | Thibault | |
| 7,315,423 B2 | 1/2008 | Sato | |
| 7,551,358 B2 | 6/2009 | Lee et al. | |
| 7,561,201 B2 | 7/2009 | Hong | |
| 7,639,935 B2 * | 12/2009 | Bartilson | H04N 5/23296 348/208.2 |
| 7,801,428 B2 | 9/2010 | Nagaishi et al. | |
| 7,810,511 B2 | 10/2010 | Fagrenius et al. | |
| 8,144,230 B2 | 3/2012 | Watanabe et al. | |
| 8,194,169 B2 | 6/2012 | Tamaki et al. | |
| 8,199,222 B2 | 6/2012 | Drimbarean et al. | |
| 8,237,841 B2 | 8/2012 | Tanida et al. | |
| 8,320,051 B2 | 11/2012 | Matsumura | |
| 8,417,058 B2 | 4/2013 | Tardif | |
| 8,482,637 B2 | 7/2013 | Ohara et al. | |
| 8,520,022 B1 | 8/2013 | Cohen et al. | |
| 8,553,106 B2 | 10/2013 | Scarff | |
| 8,619,082 B1 | 12/2013 | Ciurea et al. | |
| 8,639,296 B2 | 1/2014 | Ann et al. | |
| 8,665,341 B2 | 3/2014 | Georgiev et al. | |
| 8,704,944 B1 | 4/2014 | Wierzoch et al. | |
| 8,762,895 B2 * | 6/2014 | Mehta | G06F 3/04845 715/801 |
| 8,780,258 B2 | 7/2014 | Lee | |
| 8,896,655 B2 | 11/2014 | Mauchly et al. | |
| 9,041,826 B2 | 5/2015 | Jung et al. | |
| 9,104,705 B2 | 8/2015 | Fujinaga | |
| 9,135,732 B2 | 9/2015 | Winn et al. | |
| 9,282,228 B2 | 3/2016 | Laroia | |
| 9,374,514 B2 | 6/2016 | Laroia | |
| 2002/0149691 A1 | 10/2002 | Pereira et al. | |
| 2003/0018427 A1 | 1/2003 | Yokota et al. | |
| 2003/0020814 A1 | 1/2003 | Ono | |
| 2003/0185551 A1 | 10/2003 | Chen | |
| 2004/0100479 A1 | 5/2004 | Nakano et al. | |
| 2004/0227839 A1 | 11/2004 | Stavely et al. | |
| 2005/0088546 A1 | 4/2005 | Wang | |
| 2005/0200012 A1 | 9/2005 | Kinsman | |
| 2006/0067672 A1 | 3/2006 | Washisu et al. | |
| 2006/0187338 A1 | 8/2006 | May et al. | |
| 2006/0221218 A1 | 10/2006 | Adler et al. | |
| 2006/0238886 A1 | 10/2006 | Kushida et al. | |
| 2006/0281453 A1 | 12/2006 | Jaiswal et al. | |
| 2007/0050139 A1 | 3/2007 | Sidman | |
| 2007/0065012 A1 | 3/2007 | Yamakado et al. | |
| 2007/0127915 A1 | 6/2007 | Lu et al. | |
| 2007/0177047 A1 | 8/2007 | Goto | |
| 2007/0182528 A1 | 8/2007 | Breed et al. | |
| 2008/0030592 A1 | 2/2008 | Border et al. | |
| 2008/0074755 A1 | 3/2008 | Smith | |
| 2008/0084484 A1 | 4/2008 | Ochi et al. | |
| 2008/0111881 A1 | 5/2008 | Gibbs et al. | |
| 2008/0180562 A1 | 7/2008 | Kobayashi | |
| 2008/0211941 A1 | 9/2008 | Deever et al. | |
| 2008/0219654 A1 | 9/2008 | Border et al. | |
| 2008/0240698 A1 * | 10/2008 | Bartilson | G03B 13/12 396/78 |
| 2008/0247745 A1 | 10/2008 | Nilsson | |
| 2008/0251697 A1 | 10/2008 | Park et al. | |
| 2008/0278610 A1 | 11/2008 | Boettiger | |
| 2009/0086032 A1 | 4/2009 | Li | |
| 2009/0136223 A1 * | 5/2009 | Motomura | G02B 3/10 396/77 |
| 2009/0154821 A1 | 6/2009 | Sorek et al. | |
| 2009/0225203 A1 | 9/2009 | Tanida et al. | |
| 2009/0278950 A1 | 11/2009 | Deng et al. | |
| 2009/0290042 A1 | 11/2009 | Shiohara | |
| 2010/0013906 A1 | 1/2010 | Border et al. | |
| 2010/0034531 A1 | 2/2010 | Go | |
| 2010/0045774 A1 | 2/2010 | Len et al. | |
| 2010/0053414 A1 | 3/2010 | Tamaki et al. | |
| 2010/0079635 A1 | 4/2010 | Yano et al. | |
| 2010/0091089 A1 | 4/2010 | Cromwell et al. | |
| 2010/0097443 A1 | 4/2010 | Lablans | |
| 2010/0149353 A1 | 6/2010 | Jang et al. | |
| 2010/0225755 A1 | 9/2010 | Tamaki et al. | |
| 2010/0238327 A1 | 9/2010 | Griffith et al. | |
| 2010/0265346 A1 | 10/2010 | Iizuka | |
| 2010/0283842 A1 | 11/2010 | Guissin et al. | |
| 2010/0296802 A1 * | 11/2010 | Davies | G03B 17/00 396/77 |
| 2011/0051243 A1 | 3/2011 | Su | |
| 2011/0063325 A1 | 3/2011 | Saunders | |
| 2011/0069189 A1 | 3/2011 | Venkataraman et al. | |
| 2011/0080655 A1 | 4/2011 | Mori | |
| 2011/0123115 A1 * | 5/2011 | Lee | G06K 9/036 382/185 |
| 2011/0128393 A1 | 6/2011 | Tavi et al. | |
| 2011/0157430 A1 | 6/2011 | Hosoya et al. | |
| 2011/0157451 A1 | 6/2011 | Chang | |
| 2011/0187878 A1 | 8/2011 | Mor et al. | |
| 2011/0193984 A1 | 8/2011 | Kitaya et al. | |
| 2011/0211164 A1 | 9/2011 | Monroe et al. | |
| 2011/0221920 A1 | 9/2011 | Gwak | |
| 2011/0222167 A1 | 9/2011 | Iwasawa | |
| 2011/0242342 A1 | 10/2011 | Goma et al. | |
| 2011/0280565 A1 | 11/2011 | Chapman et al. | |
| 2011/0285895 A1 | 11/2011 | Weng et al. | |
| 2012/0002096 A1 | 1/2012 | Choi et al. | |
| 2012/0027462 A1 | 2/2012 | Nozawa | |
| 2012/0033069 A1 | 2/2012 | Becker et al. | |
| 2012/0062691 A1 | 3/2012 | Fowler et al. | |
| 2012/0155848 A1 | 6/2012 | Labowicz et al. | |
| 2012/0162464 A1 | 6/2012 | Kim | |
| 2012/0188391 A1 | 7/2012 | Smith | |
| 2012/0242881 A1 | 9/2012 | Suzuki | |
| 2012/0249815 A1 | 10/2012 | Bohn et al. | |
| 2012/0257013 A1 | 10/2012 | Witt et al. | |
| 2012/0257077 A1 | 10/2012 | Suzuki | |
| 2012/0268642 A1 | 10/2012 | Kawai | |
| 2013/0005401 A1 | 1/2013 | Rosenhan et al. | |
| 2013/0027353 A1 | 1/2013 | Hyun | |
| 2013/0050564 A1 | 2/2013 | Adams, Jr. et al. | |
| 2013/0057743 A1 | 3/2013 | Minagawa et al. | |
| 2013/0064531 A1 | 3/2013 | Pillman et al. | |
| 2013/0076928 A1 | 3/2013 | Olsen et al. | |
| 2013/0086765 A1 | 4/2013 | Chen | |
| 2013/0088614 A1 | 4/2013 | Lee | |
| 2013/0093842 A1 | 4/2013 | Yahata | |
| 2013/0093947 A1 | 4/2013 | Lee et al. | |
| 2013/0100272 A1 | 4/2013 | Price et al. | |
| 2013/0153772 A1 | 6/2013 | Rossi et al. | |
| 2013/0155194 A1 | 6/2013 | Sacre | |
| 2013/0194475 A1 | 8/2013 | Okamoto | |
| 2013/0222676 A1 | 8/2013 | Ono | |
| 2013/0223759 A1 | 8/2013 | Nishiyama | |
| 2013/0250125 A1 | 9/2013 | Garrow et al. | |

(56) References Cited

U.S. PATENT DOCUMENTS

| | | |
|---|---|---|
| 2013/0258044 A1 | 10/2013 | Betts-Lacroix |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0267243 A1 | 9/2014 | Venkataraman et al. |
| 2014/0293079 A1 | 10/2014 | Milanfar et al. |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0241713 A1 | 8/2015 | Laroia et al. |
| 2015/0253647 A1 | 9/2015 | Mercado |
| 2015/0279012 A1 | 10/2015 | Brown et al. |
| 2016/0142610 A1 | 5/2016 | Rivard et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Segan, S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

Written Opinion of the International Searching Authority from International Application No. PCT/US14/10267, pp. 1-29, dated Jul. 8, 2014.

International Search Report and Written Opinion of the International Searching Authority from International Application No. PCT/US2014/061254, pp. 1-29, dated Jan. 8, 2015.

International Search Report and Written Opinion of the International Searching Authority from International Application No. PCT/US2014/061248, pp. 1-11, dated Jan. 13, 2015.

International Search Report and Written Opinion of the International Searching Authority from International Application No. PCT/US2014/061258, pp. 1-14, dated Jan. 13, 2015.

International Search Report and Written Opinion of the International Searching Authority from International Application No. PCT/US2014/061257, pp. 1-12, dated Jan. 14, 2015.

International Search Report and Written Opinion of the International Searching Authority from International Application No. PCT/US2014/062306, pp. 1-12, dated Jan. 26, 2015.

International Search Report and Written Opinion of the International Searching Authority from International Application No. PCT/US2014/063601, pp. 1-12, dated Jan. 27, 2015.

International Search Report and Written Opinion of the International Searching Authority from International Application No. PCT/US2014/072907, pp. 1-11, dated Mar. 27, 2015.

International Search Report and Written Opinion of the International Searching Authority from International Application No. PCT/US2015/016988, pp. 1-7, dated Jun. 25, 2015.

* cited by examiner

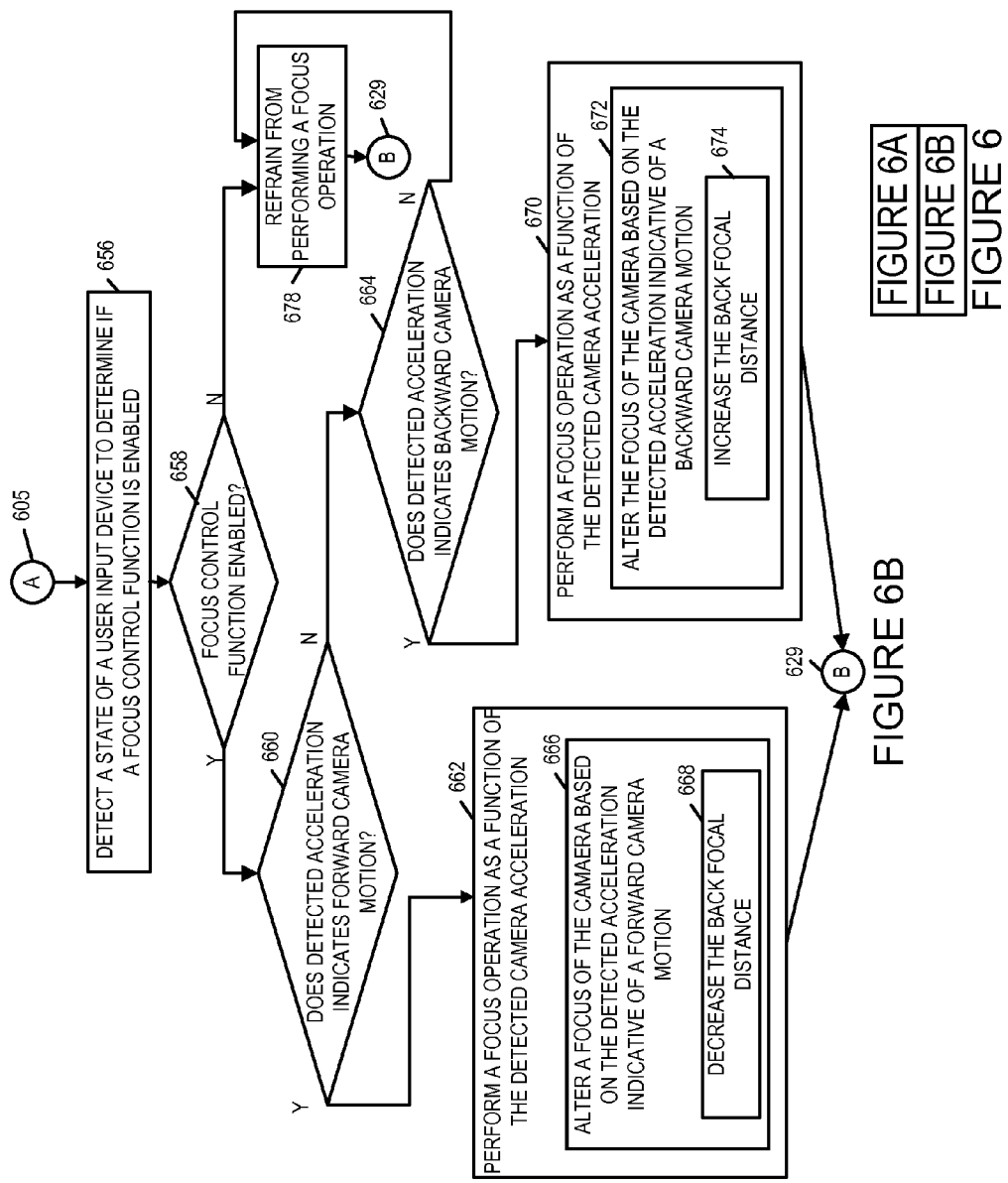

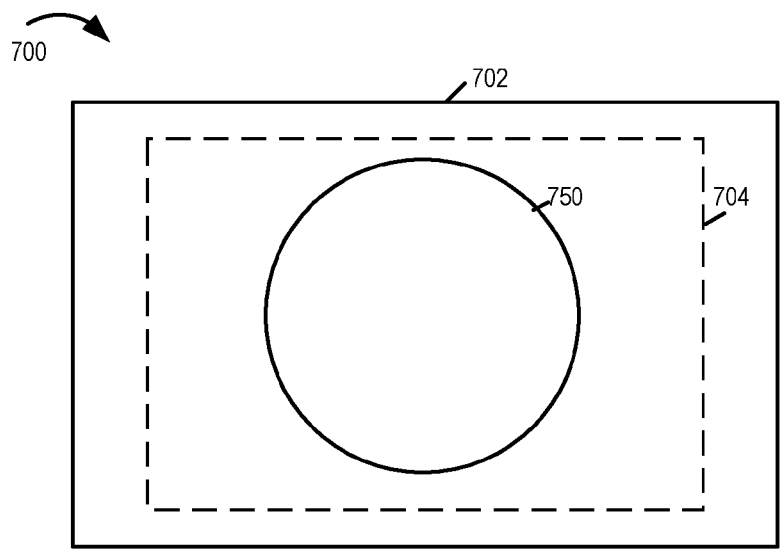
FRONT VIEW OF THE CAMERA   FIGURE 7
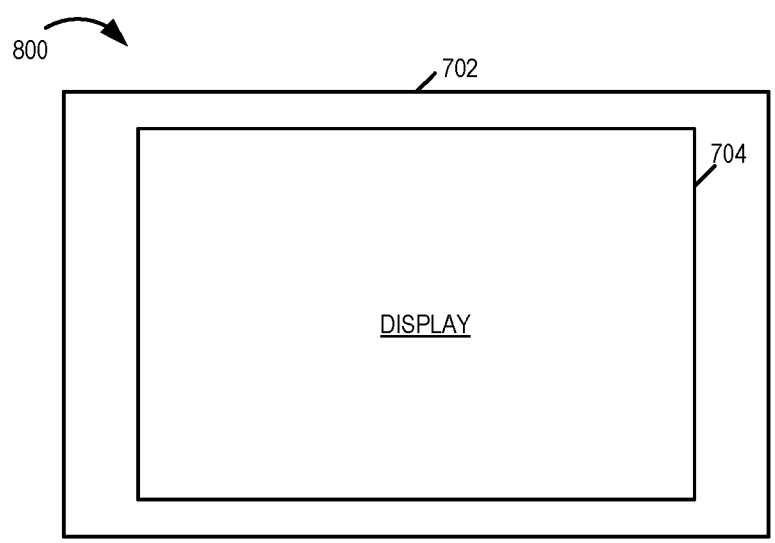
REAR VIEW OF THE CAMERA   FIGURE 8

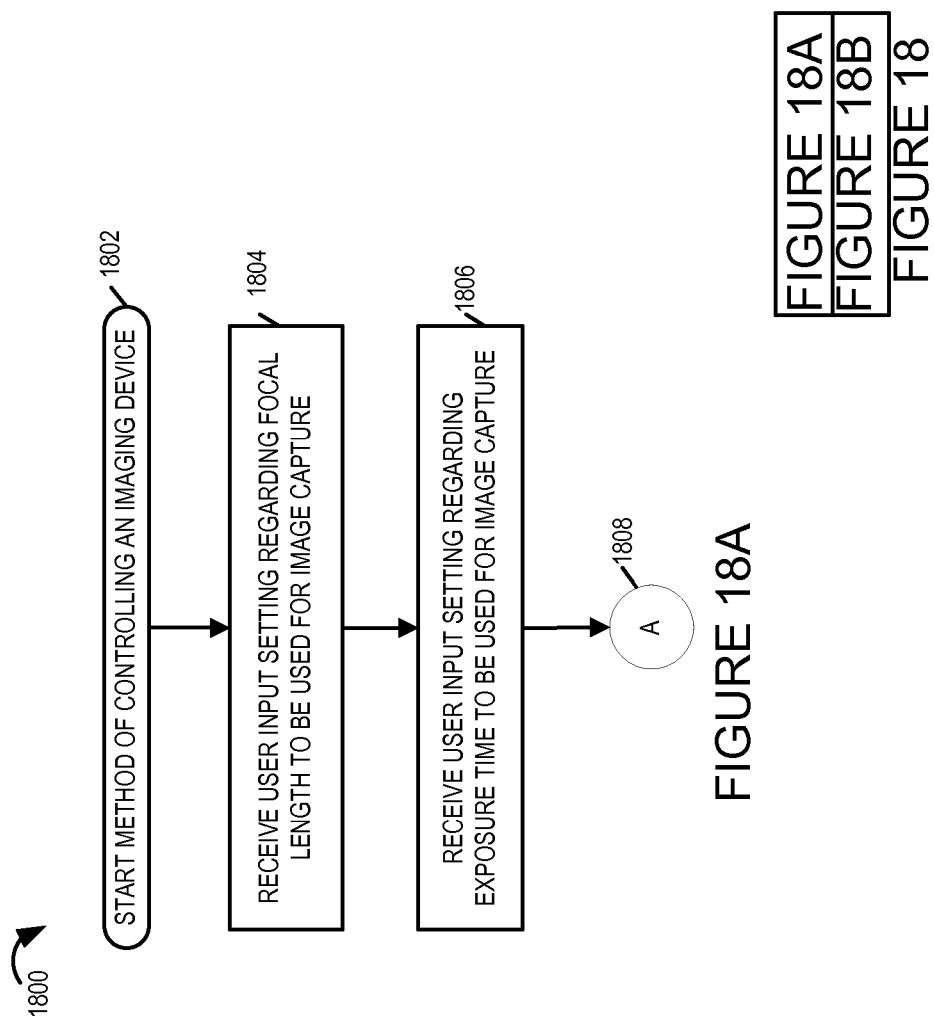

INTUITIVE CAMERA USER INTERFACE METHODS AND APPARATUS

RELATED APPLICATIONS

The present application claims the benefit of U.S. Provisional Patent Application Ser. No. 61/943,299 filed on Feb. 21, 2014 which is hereby expressly incorporated by reference in its entirety.

FIELD

The present application relates to camera control methods and apparatus and, more particularly, to methods and apparatus relating to controlling zooming and/or focusing operations.

BACKGROUND

Attempts at touch screen control of cameras has simplified many aspects of camera control. While touch screen control can be intuitive it has the disadvantage of requiring the user to touch the camera screen to implement a desired control change. The user motion associated with touching a screen which is part of a camera device can cause unintended motion of the camera device. Accordingly, while convenient, touch screen control can be disruptive and introduce unintended motion such as camera shake and/or tilting or change in camera angle if implemented while a handheld camera is capturing an image or images, e.g., as part of a video sequence or while taking one or more still frames. In addition, the touch screen soft controls/buttons offer no tactile feedback forcing the user to focus on at that part of the screen where the controls are located taking away attention from the subject of the photograph or video.

To implement zoom control, rather than use a touch screen control, in many digital cameras a toggle type control is used. Such a toggle switch is generally conveniently located near the finger tips while holding or griping the camera in the intended manner. In such cameras depressing or moving the toggle switch in one direction is used to cause the camera to zoom in at a fixed rate while depressing or moving the toggle in the opposite direction causes the camera to zoom out at a fixed rate. Sometimes the toggle switch is implemented as a pair of switches where pressing one switch causes the camera to zoom out while pressing the other causes the camera to zoom in. While pressing such switches may result in only minimal camera shake, the resulting control is not adequate and not precise as there is no way to control the rate of zooming.

In view of the above discussion, it should be appreciated that there is a need for methods and apparatus for controlling camera zoom which are less likely to cause unintended camera motion or camera shake while providing adequate and precise control of the amount and the rate of zooming. It would be desirable if at least some new zoom control methods could be developed which would allow a camera user to adequately control zoom operations in an intuitive way while minimizing any unintended camera motion or shake while doing so.

SUMMARY

Camera interface methods and apparatus are described. Among what is described are zoom control and camera focus control methods and apparatus are described. Camera motion (Acceleration) is detected, e.g., using one or more acceleration sensors which are included in the camera. When a user seeks to implement a zoom operation, a user depresses a zoom control button to enable zoom control. The zoom control button in some embodiments is arranged such that it is conveniently located close to a finger tip when holding or gripping the camera in the intended manner. In this manner application of pressure to the zoom control button is not likely to introduce any significant unintended camera motion or shake. Alternatively in some embodiments a touch sensitive control is used so that force need not be applied to the zoom control and the user can enable zoom control by merely touching a sensor with zoom control being disabled, in at least some embodiments, when the sensor is not being touched.

To implement a zoom-in operation, the user simply moves the camera forward (in the direction of the subject) while enabling zoom control, e.g., by the pressing of a button or by touching the zoom control sensor. The acceleration caused by the forward camera motion is detected by a 'forward-backward' acceleration sensor (sometimes in combination with other acceleration sensors (up-down and/or left-right) and/or gyro sensors) and interpreted as a zoom-in command. The camera, in response to the forward motion, implements a zoom-in operation either as an optical zoom or as a digital zoom or a combination. In some embodiments the rate of zooming is a function, e.g., proportional to the time integral of the amount of detected forward acceleration. In other embodiments the zoom-in operation is performed while the forward motion is detected (through measuring forward acceleration), e.g., at a predetermined zoom rate, and is stopped when the forward motion stops or maximum zoom is reached.

To implement a zoom-out operation the user, simply moves the camera backwards (away from the scene being captured) while enabling zoom control, e.g., by the pressing of the zoom control button or by touching the zoom control sensor. The backward camera motion (acceleration) is detected by a 'forward-backward' acceleration sensor (sometimes in combination with other acceleration sensors and gyro sensors) and interpreted as a zoom-out command. The camera, in response to the backward motion, implements a zoom-out operation either as an optical zoom or a digital zoom or a combination. In some embodiments the rate of zooming is a function, e.g., proportional to the time integral of the amount of detected backward acceleration. In other embodiments the zoom-out operation is performed while the backward motion is detected (through measuring forward-backward acceleration), e.g., at a predetermined zoom rate, and is stopped when the backward motion stops or maximum zoom out is reached.

It should be appreciated that the forward motion used to control the camera to perform a zoom-in operation is intuitive in that a user seeking to get a zoom-in type effect would normally move the camera closer to the object whose image is being taken. Similarly the backward motion used to control the camera to perform a zoom-out operation is intuitive in that a user seeking to get a wider shot would normally move the camera away from the object whose image is being taken. While there is camera motion involved in the zoom control operation, this motion is only a forward or backward motion which merely adds to the zoom-in or zoom-out effect facilitating the intended effect and producing no other unintended effects. Since motion is in a forward or backward direction, there is less risk that the camera angle relative to the horizontal or vertical will change significantly during the zoom control process than with some other control approaches.

The methods and apparatus for controlling zoom can be used with still cameras but are also particularly well suited when taking video images using a handheld camera allowing for smooth control of zoom functions in an intuitive manner An exemplary method of controlling a camera, in accordance with some embodiments, includes: detecting camera acceleration; and performing one of a zoom operation or a focus operation as a function of the detected camera acceleration.

An exemplary camera device, in accordance with some embodiments, comprises: an accelerometer module configured to detect camera acceleration; and at least one of: a zoom control module configured to perform a zoom operation as a function of the detected camera acceleration or a focus control module configured to perform a focus operation as a function of detected camera acceleration.

Numerous additional features and embodiments are described in the detailed description which follows.

BRIEF DESCRIPTION OF THE FIGURES

FIG. 6B illustrates a second part of a flowchart showing the steps of an exemplary method of controlling a camera device in accordance with an exemplary embodiment.

FIG. 7 illustrates a front view of an exemplary camera apparatus implemented in accordance with an exemplary embodiment.

FIG. 8 illustrates a rear view of the exemplary camera apparatus implemented in accordance with an exemplary embodiment.

FIG. 17 further illustrates the concept of controlling different sets of light emitting elements at different times in a manner that is synchronized with the timing of a rolling shutter.

FIG. 18A illustrates a first part of a flowchart showing the steps of an exemplary method of controlling an imaging device in accordance with an exemplary embodiment of the invention.

DETAILED DESCRIPTION

Figure 1A:
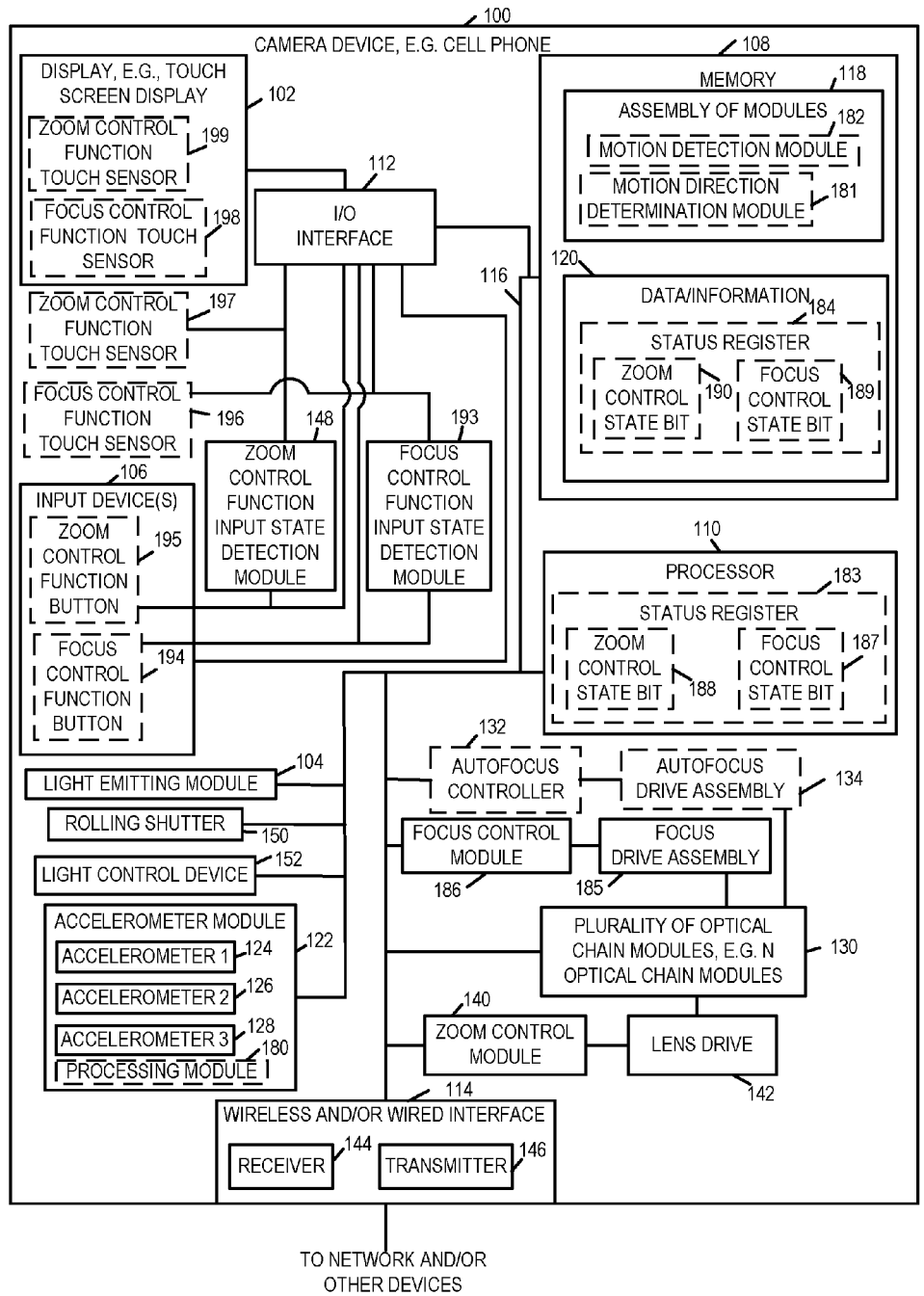
FIG. 1A is an exemplary block diagram of an exemplary apparatus, e.g., camera device, implemented in accordance with one embodiment of the present invention.

FIG. 1A illustrates an exemplary apparatus 100, sometimes referred to hereinafter as a camera device, implemented in accordance with one exemplary embodiment of the present invention. The camera device 100, in some embodiments, is a portable device, e.g., a cell phone or tablet including a camera assembly. In other embodiments, it is fixed device such as a wall mounted camera.

FIG. 1A illustrates the camera device 100 in block diagram form showing the connections between various elements of the apparatus 100. The exemplary camera device 100 includes a display device 102, a light emitter module 104, an input device(s) 106, a zoom control function input state detection module 148, a focus control function input state detection module 193, a rolling shutter 150, a light control device 152, memory 108, a processor 110, a wireless and/or wired interface 114, e.g., a cellular interface, a WIFI interface, or a USB interface, an I/O interface 112, an accelerometer module 122, and a bus 116 which are mounted in a housing represented by the rectangular box touched by the line leading to reference number 100. The light emitter module 104 includes light emitting elements which may be LEDs (Light Emitting Diodes) or other types of light emitting elements which can be individually controlled so that all the light emitting elements need not be on at the same time. The input device(s) 106 may be, and in some embodiments is, e.g., keypad, touch screen, buttons, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis. The output of the accelerometer module 122 can, and in some embodiments is, monitored with changes in accelerometer output being interpreted and checked over time by processor 110 and/or by zoom control module 140 and/or by focus control module 186 to detect changes in acceleration indicating motion in one or more directions.

In some embodiments, accelerometer module 122 includes processing module 180. In some such embodiments, processing module 180 processes output data from the accelerometers to detect camera motion and determine camera motion direction, e.g., forward or backward.

In some embodiments, assembly of modules 118 includes a motion detection module 182 configured to detect camera motion based on detected camera acceleration and a motion determination module 181 configured to determine a direction of detected camera motion, e.g., forward or backward, based on detected camera acceleration.

In some embodiments the input device 106 includes at least one zoom control function button 195 that can be used to enable or disable camera zoom control functionality. In some such embodiments when the zoom control function button 195 is in a depressed state the camera zoom control function is enabled while when the button 195 is in an undepressed state the camera zoom control function is disabled. The zoom control input state detection module 148 is configured to detect the state of the zoom control function input device, e.g., the zoom control function button 195, to detect whether the button 195 is in a depressed state or undepressed state. In some embodiments there is status register in the camera device 100 that includes a bit indicating the state of the zoom control function button detected by the zoom control input state detection module 148, e.g., whether it is in the depressed state indicating that zoom control function is enabled or whether it is undepressed indicating that the zoom control function is disabled. In some embodiments, a status register 183 including zoom control state bit 188 is included as part of processor 110. In some embodiments, a status register 184 including zoom control state bit 190 is included as part of data/information 120.

In some embodiments the input device(s) 106 includes at least one focus control function button 194 that can be used to enable or disable camera focus control functionality. In some such embodiments when the focus control function button 194 is in a depressed state the camera focus control function is enabled while when the button 194 is in an undepressed state the camera focus control function is disabled. The focus control function input state detection module 193 is configured to detect the state of the input device, e.g., the focus control function button 194, to detect whether the button 194 is in a depressed state or undepressed state. In some embodiments there is status register in the camera device 100 that includes a bit indicating the state of the focus control button detected by the focus control input state detection module 193, e.g., whether it is in the depressed state indicating that focus control function is enabled or whether it is undepressed indicating that focus control function is disabled. In some embodiments, a status register 183 including focus control state bit 187 is included as part of processor 110. In some embodiments, a status register 184 including focus control state bit 189 is included as part of data/information 120.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device 106, e.g., an input device including buttons. As will be discussed in some embodiments a zooming control function can be enabled by pressing a zoom control function sensor, e.g., a touch sensor. In some embodiments, a zoom control function touch sensor 199 is part of the display device 102, which is a touch screen display. In some embodiments, a zoom control function touch sensor 197 is a touch sensor, which is external to display 102. In some embodiments when the camera user touches the zoom control function sensor the zoom control functionality is enabled. For example a finger on the touch sensor (199 or 197) activates/enables the zoom control functionality. In some embodiments, the zoom control input state detection module 148 is configured to detect the state of the input device, e.g., the zoom control function touch sensor (199 or 197), to detect whether the touch sensor is being touched.

As will be discussed in some embodiments a focus control function can be enabled by pressing a focus control function sensor, e.g., a touch sensor. In some embodiments, a focus control function touch sensor 198 is part of the display device 102, which is a touch screen display. In some embodiments, a focus control function touch sensor 196 is a touch sensor, which is external to display 102. In some embodiments when the camera user touches the focus control function sensor the focus control functionality is enabled. For example a finger on the touch sensor (198 or 196) activates/enables the zoom control functionality. In some embodiments, the focus control function input state detection module 193 is configured to detect the state of the input device, e.g., the focus control function touch sensor (198 or 196), to detect whether the touch sensor is being touched.

In some embodiments, when a zoom control function touch sensor (199, 197) or a focus control function touch sensor (198, 196) is touched and the camera device transitions to a zoom control function enabled state or a focus control enabled state, the camera device remains in the enabled state for a predetermined amount of time. In some such embodiments, after the predetermined amount of time is completed, the camera device transitions from the enabled state to a non enabled state.

The I/O interface 112 couples the display 102 and input device 106 to the bus 116 and interfaces between the display 102, input device 106 and the other elements of the camera which can communicate and interact via the bus 116. In addition to being coupled to the I/O interface 112, the bus 116 is coupled to the memory 108, processor 110, an optional autofocus controller 132, the wireless and/or wired interface 114, a zoom control module 140, and a plurality of optical chain modules 130, e.g., N optical chain modules. In some embodiments N is an integer greater than 2, e.g., 3, 4, 7 or a larger value depending on the particular embodiment. Images captured by individual optical chain modules in the plurality of optical chain modules 130 can be stored in memory 108, e.g., as part of the data/information 120 and processed by the processor 110, e.g., to generate one or more composite images. Multiple captured images and/or composite images may be processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are uses as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some embodiments, sequentially, so that different portions of an area are illuminated at different times so that the full area need not be consistently lighted during image capture. While all lighting elements are normally not kept on for the full duration of an image capture operation involving the reading out of the full set of pixel elements of a sensor, the portion of area which is having its image captured at a given time as a result of the use of a rolling shutter will be illuminated thanks to synchronization of the lighting of light emitting elements with trolling shutter operation. Thus, with various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which is captured by a different portion of the image sensor. Lenses may, and in some embodiments are used to direct the light to the area which will be captured by the camera through the use of one or more optical chain module with lenses. In at least some embodiments the lenses used for lighting are matched or selected based on the focal length of the optical chain being used at a particular point in time.

The rolling shutter 150 is an electronic shutter that controls reading out of different portions of an image sensor at different times. While an electronic rolling shutter is used in most of the embodiments, a mechanical rolling shutter may still be used in some embodiments.

The light control device 152 is configured to control light emitting elements (e.g., included in the LED module 104) in a synchronized manner with the operation of the rolling shutter 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the time first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of said image sensor.

In some embodiments the light control device 152 is further configured to the second set of light emitting elements to be off during said portion of time in included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments light control device is further configured to determine which sets of light emitting elements to use based on an effective focal length setting being used by the camera device.

The accelerometer module 122 includes a plurality of accelerometer including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. The camera acceleration detected by an accelerometer in a given direction is monitored. Acceleration and/or changes in acceleration, indicative of camera motion, are monitored and processed to detect one or more directions, e.g., forward camera motion, backward camera motion, etc. As discussed below, the acceleration indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus controller 132 is present in at least some autofocus embodiments but would be omitted in fixed focus embodiments. The autofocus controller 132 controls adjustment of at least one lens position in the optical chain modules used to achieve a desired, e.g., user indicated, focus. In the case where individual drive assemblies are included in each optical chain module, the autofocus controller 132 may drive the autofocus drive of various optical chain modules to focus on the same target. As will be discussed further below, in some embodiments lenses for multiple optical chain modules are mounted on a single platter which may be moved allowing all the lenses on the platter to be moved by adjusting the position of the lens platter. In some such embodiments the autofocus drive assembly 134 is included as an element that is external to the individual optical chain modules with the drive assembly 134 driving the platter including the lenses for multiple optical chains under control of the autofocus controller 132. While the optical chain modules will in many embodiments be focused together to focus on an object at a particular distance from the camera device 100, it is possible for different optical chain modules to be focused to different distances and in some embodiments different focus points are intentionally used for different optical chains to increase the post processing options which are available.

The zoom control module 140 is configured to perform a zoom operation as a function of detected camera acceleration. In some embodiments the camera acceleration indicative of one of a forward camera motion or a backward camera motion is used to control zoom operations. Thus in some embodiments the zoom control module 140 performs a zoom operation by controlling a direction of zoom based on whether the detected acceleration is indicative of a forward or backward camera motion. In some embodiments the zoom control module 140 performs a zoom in operation when the detected acceleration is indicative of a forward camera motion. In some embodiments the zoom control module 140 performs a zoom out operation when the detected acceleration is indicative of a backward camera motion. In some embodiments the zoom control module is configured to detect the state of a user input device, e.g., zoom control button, to determine if a zoom function is enabled, prior to performing a zoom operation and perform the zooming operation as a function of the detected camera acceleration when the state of the user input device indicates zoom operation is enabled but not when the state of the user input device indicates that the zoom operation is not enabled.

In some embodiments the zoom control module 140 control adjustment of at least one lens position in the optical chain modules used to achieve a desired, e.g., user desired, zoom. In some embodiments this is performed by the zoom control module 140 by controlling the lens drive (LD) 142 which adjust the position of a lens and/or swaps a first lens with a second lens by moving a platter with multiple lenses to implement the zooming operation. In some embodiments where a plurality of lens drives are used with each lens drive corresponding to a different optical chain, the zoom control module 140 controls the lens drive of various optical chain modules to adjust, e.g., move and/or shift, a lens position in the corresponding optical chain. In some embodiments the lens drive 142 is included as an element that is external to the individual optical chain modules with the lens drive assembly 142 driving a platter including multiple lenses corresponding to multiple optical chains under control of the zoom control module 140. In some such embodiments the LD 142 is responsive to the zoom control module 140 which operates in response to detected camera acceleration and can move a platter including multiple lenses vertically, horizontally or in some combination of vertical and horizontal motion to implement a lens change operation. The lens drive 142 may be implemented with a motor and mechanical linkage to the platter including the lenses. In some embodiments, the lens drive 142 may also rotate the platter to support changes. The rotation may be an off center rotation and/or may be performed in combination with one or more other platter position changes.

In some embodiments the zoom control module serves as a focal length determination module to determine the focal length from a user setting, e.g., a focal length set by a user of the camera via a zoom control input. A change in zoom in some embodiments is achieved by moving one or more lenses outward towards the front of the camera to increase the zoom and towards the back of the camera to decrease the zoom and allow a larger image area to be captured. In other embodiments a change in one or more lenses is used to implement a zoom operation. While various methods and apparatus for implementing a zoom change have been described, the zoom control interface described herein can be used with a wide range of zoom mechanisms and is not limited to implementing a zoom operation in a particular way.

The focus control module 186 is configured to perform a focus operation as a function of detected camera acceleration. In some embodiments the camera acceleration indicative of one of a forward camera motion or a backward camera motion is used to control focus operations. Thus in some embodiments the focus control module 186 alters, e.g., decreases or increases, a back focal distance of the camera based on whether the detected acceleration is indicative of a forward or backward camera motion. In some embodiments the focus control module 186 performs a back focal distance focal decrease operation when the detected acceleration is indicative of a forward camera motion. In some embodiments the focus control module 186 performs a back focal distance increase operation when the detected acceleration is indicative of a backward camera motion. In some embodiments the focus control module is configured to detect the state of a user input device, e.g., a focus control button or a focus control function touch sensor, to determine if the focus control function is enabled, prior to performing a focus control operation and perform the focus control operation as a function of the detected camera acceleration when the state of the user input device indicates the focus control operation is enabled but not when the state of the user input device indicates that the focus control operation is not enabled.

In various embodiments, the focus control module 186 sends signals to the focus drive assembly 185 to make focus adjustments, e.g., decrease or increase back focal distance.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1A, various features relating to the plurality of optical chain modules 130 will now be discussed with reference to FIGS. 1B and 1C which show the camera device 100 from front and side perspectives, respectively. Dashed line 101 of FIG. 1B indicates a cross section line corresponding to the FIG. 1C view.

Box 117 represents a key and indicates that OCM=optical chain module and each L1 represents an outermost lens in an optical chain module. Box 119 represents a key and indicates that S=sensor, F=filter, L=lens, L1 represents an outermost lens in an optical chain module, and L2 represents an inner lens in an optical chain module.

Figure 1B:
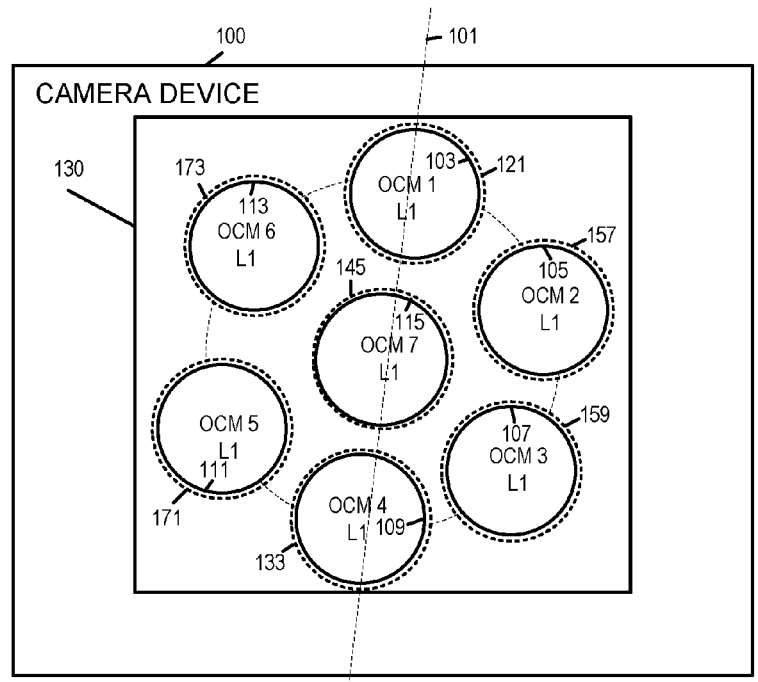
FIG. 1B illustrates a frontal view of an apparatus implemented in accordance with an exemplary embodiment which incorporates multiple optical chain modules in accordance with the present invention with lenses which are viewable from the front of the camera.

FIG. 1B shows the front of the camera device 100. Rays of light 131, which is light toward the front of the camera assembly, shown in FIG. 1C may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chain modules 130 is mounted.

Figure 1C:
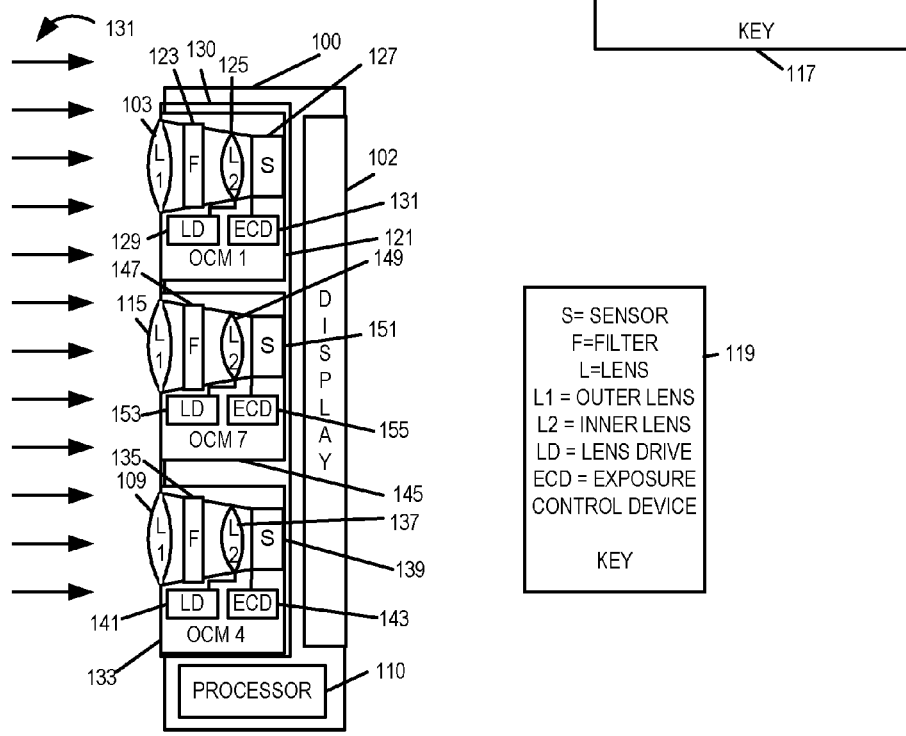
FIG. 1C, which is a side view of the exemplary apparatus of FIG. 1B, illustrates further details of the exemplary apparatus.

FIG. 1C, which shows a side perspective of camera device 100, illustrates three of the seven optical chain modules (OCM 1 121, OCM 7 145, OCM 4 133) of the set of optical chain modules 130, display 102 and processor 110. OCM 1 121 includes an outer lens L1 103, a filter 123, an inner lens L2 125, and a sensor 127. In some embodiments the OCM 1 121 further includes lens drive (LD) 129 for controlling the position of lens L2 125 for zooming operation purposes, and an exposure control device (ECD) 131 for controlling sensor 127. The LD 129 includes a motor or other drive mechanism which can move the lens (or sensor) to which it is connected. While the LD 129 is shown coupled, e.g., connected, to the lens L2 125 and thus can move the position of the lens L2, e.g., as part of a zooming operation, in other embodiments the LD 129 is coupled to the sensor 127 and moves the position of the sensor 127, e.g., to change the distance between the sensor 127 and the lens 125 as part of a zooming and/or focus operation. OCM 7 145 includes an outer lens L1 115, a filter 147, an inner lens L2 149, and a sensor 151. OCM 7 145 further includes LD 153 for controlling the position of lens L2 149 and ECD 155 for controlling sensor 151.

OCM 4 133 includes an outer lens L1 109, a filter 135, an inner lens L2 137, and a sensor 139. The LD 153 includes a motor or other drive mechanism which can move the lens (or sensor) to which it is connected. While the LD 153 is shown coupled, e.g., connected, to the lens L2 149 and thus can move the position of the lens L2 as part of a focus operation, in other embodiments the LD 149 is coupled to the sensor 151 and moves the position of the sensor 151, e.g., to change the distance between the sensor 151 and the lens 149 as part of a zooming and/or focus operation.

OCM 4 133 further includes LD 141 for controlling the position of lens L2 137 and ECD 143 for controlling sensor 139. The LD 141 includes a motor or other drive mechanism which can move the lens (or sensor) to which it is connected. While the LD 141 is shown coupled, e.g., connected, to the lens L2 137 and thus can move the position of the lens L2 as part of a zooming and/or focus operation, in other embodiments the LD 141 is coupled to the sensor 139 and moves the position of the sensor 139, e.g., to change the distance between the sensor 139 and the lens 137 as part of a zooming operation.

While only three of the OCMs are shown in FIG. 1C it should be appreciated that the other OCMS of the camera device 100 may, and in some embodiments do, have the same or similar structure.

FIG. 1C and the optical chain modules (OCMs), also sometimes referred to as optical camera modules, illustrated therein are illustrative of the general structure of OCMs used in various embodiments. However, numerous modifications and particular configurations are possible. Many of the particular configurations will be discussed below with use of reference to the optical camera modules shown in FIG. 1C. While reference to elements of FIG. 1C may be made, it is to be understood that the OCMs in a particular embodiment will be configured as described with regard to the particular embodiment. Thus, for example, the filter may be of a particular color. Similarly, in embodiments where the filter is expressly omitted and described as being omitted or an element which allows all light to pass, while reference may be made to the OCMs of FIG. 1C, it should be appreciated that the filter will be omitted in an embodiment where it is indicated to be omitted or of such a nature that it passes a broad spectrum of light to pass if the embodiment is indicated to have a broadband filter. As will be discussed below, the elements of the different OCMs may, but need not be, mounted on a common support device, e.g., disc or platter, allowing a set of filters, lenses or sensors of the different optical chains to be moved as a set. While in the OCMs of FIG. 1C mirrors are not shown, as will be discussed below, in at least some embodiments one or more mirrors are added to the OCMs to all light to be directed, e.g., to increase the length of the optical path or make for a more convenient internal component configuration. It should be appreciated that each of the OCMS 121, 145, 133, shown in FIG. 1C will have their own optical axis which corresponds to the path light entering the particular OCM will follow as it passes from the lens 103, 115, or 109 at the front of the optical chain and passes through the OCM to the corresponding sensor 127, 151, 139.

While the processor 110 is not shown being coupled to the LD, ECD and sensors 127, 151, 139 it is to be appreciated that such connections exist and are omitted from FIG. 1C to facilitate the illustration of the configuration of the exemplary OCMs.

As should be appreciated the number and arrangement of lens, filters and/or mirrors can vary depending on the particular embodiment and the arrangement shown in FIG. 1C is intended to be exemplary and to facilitate an understanding of the invention rather than limiting in nature.

The front of the plurality of optical chain modules 130 is visible in FIG. 1B with the outermost lens of each optical chain module appearing as a circle represented using a solid line (OCM 1 L1 103, OCM 2 L1 105, OCM 3 L1 107, OCM 4 L1 109, OCM 5 L1 111, OCM 6 L1 113, OCM 7 L1 115). In the FIG. 1B example, the plurality of optical chain modules 130 include seven optical chain modules, OCM 1 121, OCM 2 157, OCM 3 159, OCM 4 133, OCM 5 171, OCM 6 173, OCM 7 145, which include lenses (OCM 1 L1 103, OCM 2 L1 105, OCM 3 L1 107, OCM 4 L1 109, OCM 5 L1 111, OCM 6 L1 113, OCM 7 L1 115), respectively, represented by the solid circles shown in FIG. 1B. The lenses of the optical chain modules are arranged to form a pattern which is generally circular in the FIG. 1B example when viewed as a unit from the front. While a circular arrangement is preferred in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

Note that the individual outer lenses, in combination, occupy an area that might otherwise have been occupied by a single large lens. Thus, the overall total light capture area corresponding to the multiple lenses of the plurality of chain modules OCM 1 to OCM 7, also sometimes referred to as optical camera modules, approximates that of a lens having a much larger opening but without requiring a single lens having the thickness which would normally be necessitated by the curvature of a single lens occupying the area which the lenses shown in FIG. 1B occupy.

While gaps are shown between the lens openings of the optical chain modules OCM 1 to OCM 7, it should be appreciated that the lenses may be made, and in some embodiments are, made so that they closely fit together minimizing gaps between the lenses represented by the circles formed by solid lines. While seven optical chain modules are shown in FIG. 1B, it should be appreciated that other numbers of optical chain modules are possible.

As will be discussed below, the use of seven optical chain modules provides a wide degree of flexibility in terms of the types of filter combinations and exposure times that can be used for different colors while still providing an optical camera module that can be used to provide an image for purposes of user preview of the image area and selection of a desired focal distance, e.g., by selecting an object in the preview image which is to be the object where the camera modules are to be focused.

For example, in some embodiments, at least some of the different optical chain modules include filters corresponding to a single color thereby allowing capture of a single color at the full resolution of the image sensor, e.g., the sensor does not include a Bayer filter. In one embodiment two optical chain modules are dedicated to capturing red light, two optical chain modules are dedicated to capturing green light and two optical chain modules are dedicated to capturing blue light. The center optical chain module may include a RGB filter or opening which passes all colors with different portions of the sensor of the center optical chain module being covered by different color filters, e.g., a Bayer pattern with the optical chain module being used to capture all three colors making it easy to generate color preview images without having to process the output of multiple optical chain modules to generate a preview image.

The use of multiple optical chains such as shown in the FIG. 1A-1C embodiment has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

As should be appreciated, different wavelengths of light will be bent by different amounts by the same lens. This is because the refractive index of glass (or plastic) which the lens is made of changes with wavelength. Dedication of individual optical chains to a particular color allows for the lenses for those optical chains to be designed taking into consideration the refractive index of the specific range of wavelength for that color of light. This can reduce chromatic aberration and simplify lens design. Having multiple optical chains per color also has the advantage of allowing for different exposure times for different optical chains corresponding to a different color. Thus, as will be discussed further below, a greater dynamic range in terms of light intensity can be covered by having different optical chains use different exposure times and then combining the result to form the composite image, e.g., by weighting the pixel values output by the sensors of different optical chains as a function of exposure time when combing the sensed pixel values to generate a composite pixel value for use in a composite image. Given the small size of the optical sensors (pixels) the dynamic range, in terms of light sensitivity, is limited with the sensors becoming easily saturated under bright conditions. By using multiple optical chains corresponding to different exposure times the dark areas can be sensed by the sensor corresponding to the longer exposure time while the light areas of a scene can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 1C is a cross section perspective of the camera device 100 shown in FIGS. 1A and 1B. Dashed line 101 in FIG. 1B shows the location within the camera device to which the cross section of FIG. 1C corresponds. From the side cross section, the components of the first, seventh and fourth optical chains are visible.

As illustrated in FIG. 1C despite including multiple optical chains the camera device 100 can be implemented as a relatively thin device, e.g., a device less than 2, 3 or 4 centimeters in thickness in at least some embodiments. Thicker devices are also possible, for example devices with telephoto lenses and are within the scope of the invention, but the thinner versions are particularly well suited for cell phones and/or tablet implementations.

As illustrated in the FIG. 1C diagram, the display device 102 may be placed behind the plurality of optical chain modules 130 with the processor 110, memory and other components being positioned, at least in some embodiments, above or below the display and/or optical chain modules 130. As will be discussed below, and as shown in FIG. 1C, each of the optical chains OCM 1 121, OCM 7 145, OCM 4 133 may, and in some embodiments do, include an outer lens L1, an optional filter F, and a second optional lens L2 which proceed a sensor S which captures and measures the intensity of light which passes through the lens L1, filter F and second lens L2 to reach the sensor S. The filter may be a color filter or one of a variety of other types of light filters.

In FIG. 1C, each optical chain module includes a lens drive (LD) also sometimes referred to as an lens drive device which can alter the position of the second lens L2, e.g., move it forward, backward or change the position of the lens otherwise, as part of a zooming and/or focus operation. An exposure control device (ECD) which controls the light exposure time of the sensor to which the ECD corresponds, is also included in each of the OCMs shown in the FIG. 1C embodiment. The LD of each optical chain module operates under the control of the zoom control module 140. The zoom control module 140 while shown as a separate element of the device 100 can be implemented as a module stored in memory and executed by processor 110.

Note that while supporting a relatively large light capture area and offering a large amount of flexibility in terms of color filtering and exposure time, the camera device 100 shown in FIG. 1C is relatively thin with a thickness that is much less, e.g., ⅕th, 1/10th, 1/20th or even less than the overall side to side length or even top to bottom length of the camera device visible in FIG. 1B.

Figure 2:
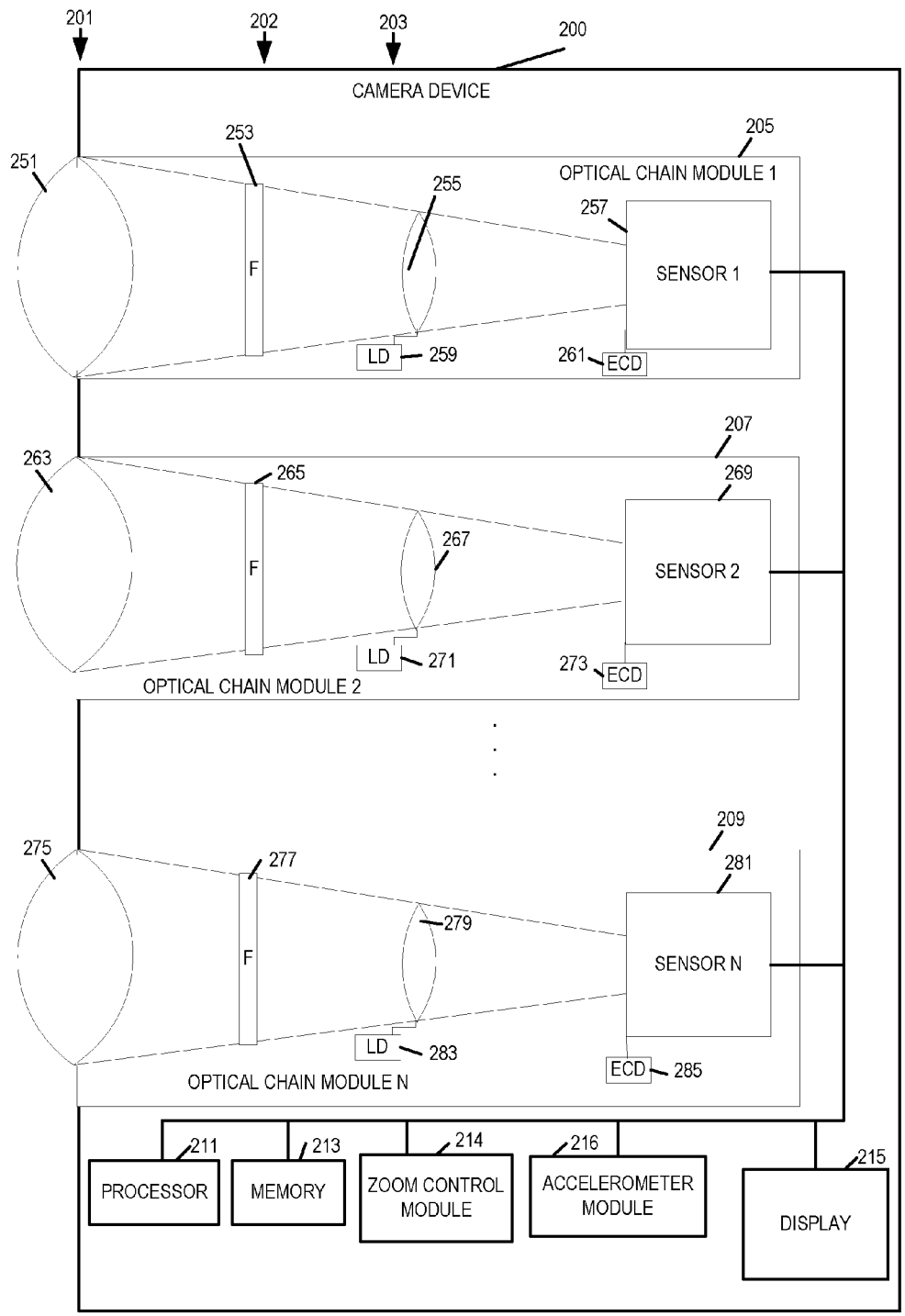
FIG. 2 illustrates a camera device implemented in accordance with one embodiment.

FIG. 2 illustrates a camera device 200 implemented in accordance with the invention. The FIG. 2 camera device 200 includes many or all of the same elements shown in the device 100 of FIGS. 1A-1C. Exemplary camera device 200 includes a plurality of optical chain modules (OCM 1 205, OCM 2 207, . . . , OCM N 209, a processor 211, memory 213 and a display 215, coupled together. OCM 1 205 includes outer lens L1 251, filter 253, inner lens L2 255, sensor 1 257, AFD 259 and ECD 261. In some embodiments, processor 211 of camera device 200 of FIG. 2 is the same as processor 110 of device 100 of FIG. 1A, memory 213 of device 200 of FIG. 2 is the same as memory 108 of device 100 of FIG. 1A, the zoom control module 214 of device 200 is the same as zoom control module 140 of device 100, the accelerometer module 216 of device 200 is the same as accelerometer module 122 of device 100 and display 215 of device 200 of FIG. 2 is the same as display 102 of device 100 of FIG. 1A.

OCM 2 207 includes outer lens L1 263, filter 265, inner lens L2 267, sensor 2 269, AFD 271 and ECD 273. OCM N 209 includes outer lens L1 275, filter 277, inner lens L2 279, sensor N 281, AFD 283 and ECD 285. Box 217, which represents a key, indicates that ECD=exposure control device and LD=lens drive.

In the FIG. 2 embodiment the optical chain modules (optical chain module 1 205, optical chain module 2 207, . . . , optical chain module N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 2, the structural relationship between the various lenses and filters which precede the sensor in each optical chain module can be seen more clearly. While three elements, e.g. two lenses (see columns 201 and 203 corresponding to L1 and L2, respectively) and the filter (corresponding to column 202) are shown in FIG. 2 before each sensor, it should be appreciated that a much larger combination of lenses and/or filters may precede the sensor of one or more optical chain modules with anywhere from 2-10 elements being common and an even larger number of elements being used in some embodiments, e.g., high end embodiments and/or embodiments supporting a large number of filter and/or lens options.

In some but not all embodiments, optical chain modules are mounted in the camera device to extend from the front of the camera device towards the back, e.g., with multiple optical chain modules being arranged in parallel. Filters and/or lenses corresponding to different optical chain modules may, and in some embodiments are, arranged in planes extending perpendicular to the front to back direction of the camera device from the bottom of the camera device towards the top of the camera device. While such a mounting arrangement is used in some embodiments, other arrangements where the optical chain modules are arranged at different angles to one another and/or the camera body are possible.

Note that the lenses/filters are arranged in planes or columns in the vertical dimension of the camera device 200 to which reference numbers 201, 202, 203 correspond. The fact that the lenses/filters are aligned along vertical planes allows for a manufacturing and structural simplification that is used in some embodiments. That is, in some embodiments, the lenses and/or filters corresponding to a plane 201, 202, 203 are formed or mounted on a platter or plate. The term platter will be used for discussion purposes but is not intended to be limiting. The platter may take the form of a disc but non-round platters are also contemplated and are well suited for some embodiments. In the case of plastic lenses, the lenses and platter may be molded out of the same material in a single molding operation greatly reducing costs as compared to the need to manufacture and mount separate lenses. As will be discussed further, platter based embodiments allow for relatively simple synchronized focus operations in that a platter may be moved front or back to focus multiple OCMs at the same time. In addition, as will be explained, platters may be moved or rotated, e.g., along a central or non-central axis, to change lenses and or filters corresponding to multiple optical chain modules in a single operation. A single platter may include a combination of lenses and/or filters allowing, e.g., a lens to be replaced with a filter, a filter to be replaced with a lens, a filter or lens to be replaced with an unobstructed opening. As should be appreciated the platter based approach to lens, filter and/or holes allows for a wide range of possible combinations and changes to be made by simple movement of one or more platters. It should also be appreciated that multiple elements may be combined and mounted together on a platter. For example, multiple lenses, filters and/or lens-filter combinations can be assembled and mounted to a platter, e.g., one assembly per optical chain module. The assemblies mounted on the platter for different optical chains may be moved together, e.g., by rotating the platter, moving the platter horizontally or vertically or by moving the platter using some combination of one or more such movements.

While platters have been described as being moved to change elements in an optical chain, they can, and in some embodiments are, moved for image stabilization purposes. For example, a platter having one or more lenses mounted thereon can be moved as part of an image stabilization operation, e.g., to compensate for camera motion.

While mounting of lenses and filters on platters has been discussed, it should also be appreciated that the sensors of multiple optical chains can be mounted on a platter. For example, sensors without color filters may be replaced with sensors with color filters, e.g., Bayer pattern filters. In such an embodiment sensors can be swapped or changed while leaving one or more components of one or more optical chains in place.

Note from a review of FIG. 2 that in some embodiments, e.g., larger focal length telephoto applications, the elements, e.g., filters/lenses closer to the sensor of the optical chain module, are smaller in size than the outer most lenses shown in column 201. As a result of the shrinking size of the lenses/filters, space becomes available between the lenses/filters within the corresponding platter.

Figure 3A:
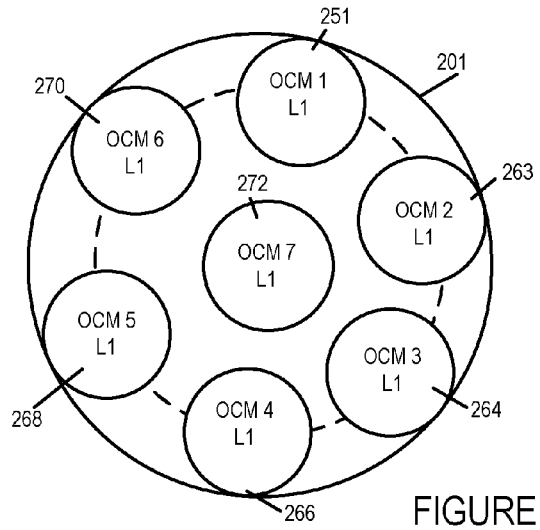
FIG. 3A shows an exemplary lens configuration which may be used for the set of outer lenses of the camera device shown in FIGS. 1A-1C.
Figure 3B:
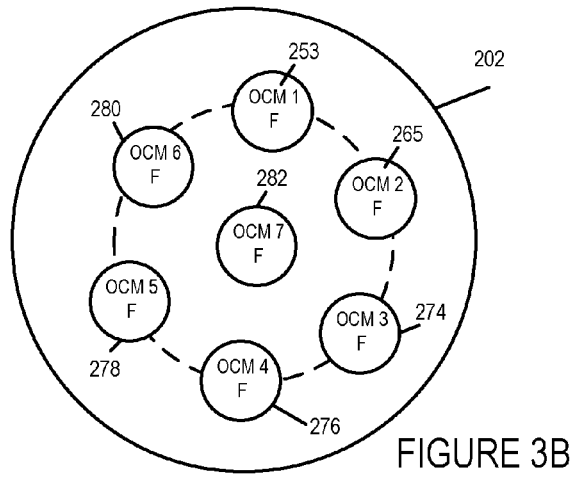
FIG. 3B illustrates an exemplary filter arrangement which is used in the camera of FIGS. 1A-1C in some embodiments.
Figure 3C:
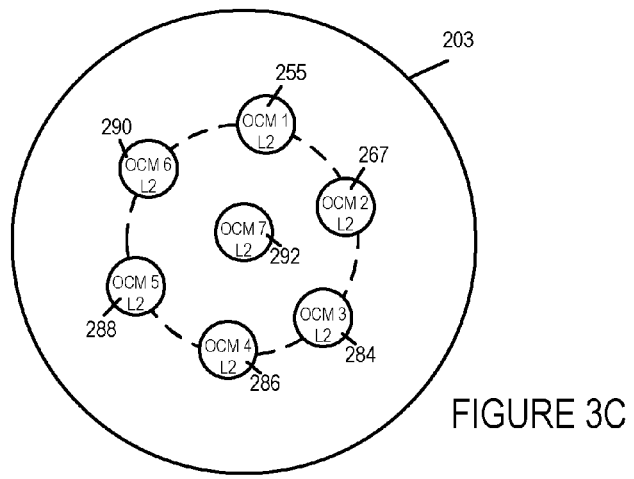
FIG. 3C shows an exemplary inner lens configuration which may, and in some embodiments is, used for a set of inner lenses of the camera device shown in FIGS. 1A-1C.

FIGS. 3A through 3C provide perspective views of the different planes 201, 202, 203 shown in FIG. 2. As shown in FIG. 3A, the outer lenses L1 (OCM 1 L1 251, OCM 2 L1 263, OCM 3 L1 264, OCM 4 L1 266, OCM 5 L1 268, OCM 6 L1 270, OCM 7 L1 272) occupy much of the outer circular area corresponding to the front of the camera modules as previously shown in FIG. 1B. However, as shown in FIG. 3B the filters (OCM 1 F 253, OCM 2 F 265, OCM 3 F 274, OCM 4 F 276, OCM 5 F 278, OCM 6 F 280, OCM 7 F 282) corresponding to plane 202 occupy less space than the lenses shown in FIG. 3A while the inner lenses L2 (OCM 1 L2 255, OCM 2 L2 267, OCM 3 L2 284, OCM 4 L2 286, OCM 5 L2 288, OCM 6 L2 290, OCM 7 L2 292) shown in FIG. 3C occupy even less space. In some embodiments, where N=7, outer lens L1 275, filter F 277, and inner lens L2 279 of FIG. 2 are the same as OCM 7 L1 272 of FIG. 3A, OCM 7 F 282 of FIG. 3B and OCM 7 L2 292 of FIG. 3C, respectively.

The decreasing size of the inner components allow multiple lenses and/or filters to be incorporated into a platter corresponding to one or more of the inner planes. Consider for example that an alternative filter F' or hole could be mounted/drilled below or next two each filter F of a platter corresponding to plan 202 and that by shifting the position or platter vertically, horizontally or a combination of horizontally and vertically, the filter F can be easily and simply replaced with another filter or hole. Similarly the lenses L2 may be replaced by alternative lenses L2' by shifting a platter of lenses corresponding to plane 203. In some embodiments, the platter may also be rotated to support changes. The rotation may be an off center rotation and/or may be performed in combination with one or more other platter position changes.

Figure 4:
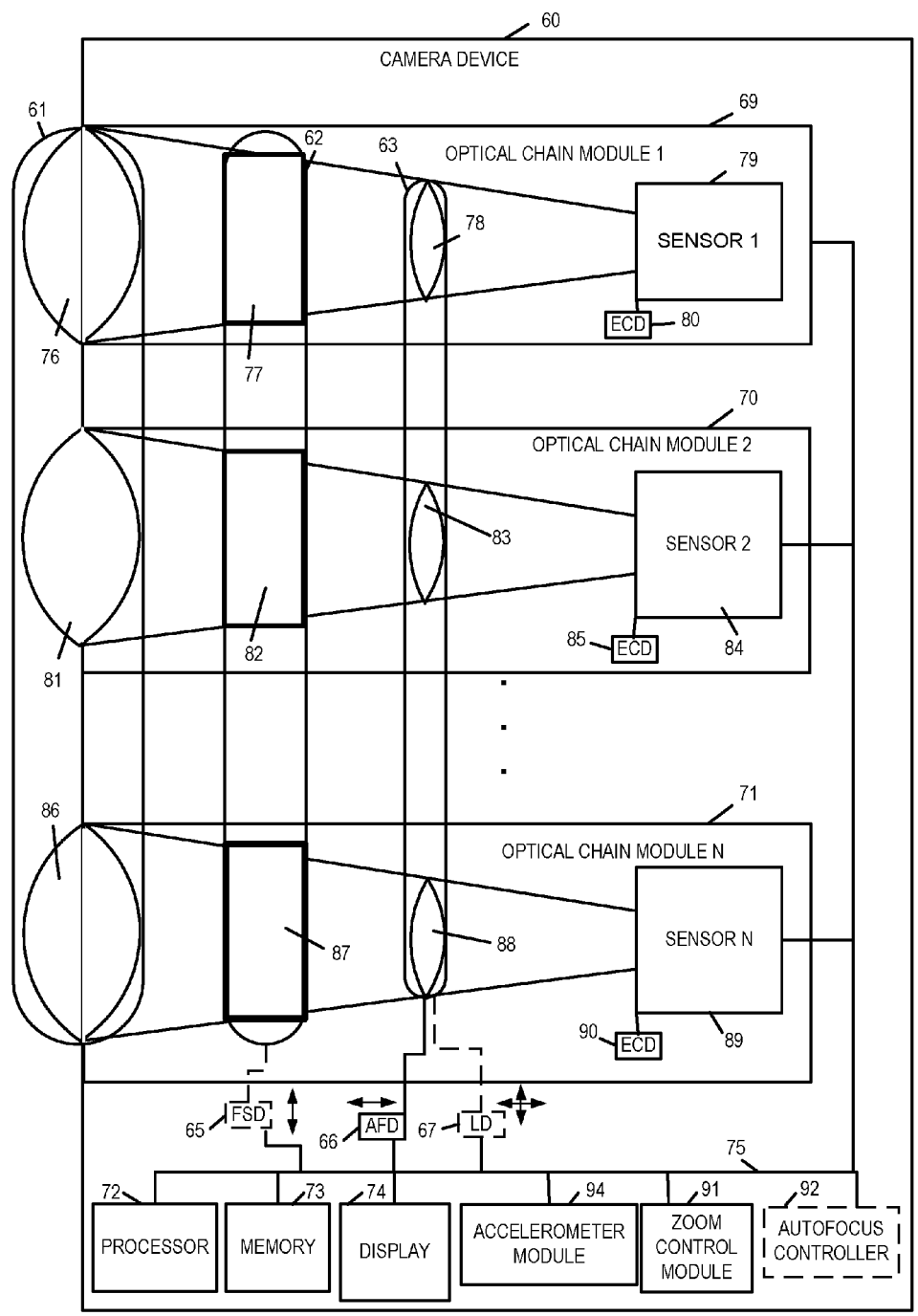
FIG. 4 illustrates an exemplary camera device in which the sets of outer lenses, filters, and inner lenses are mounted on corresponding platters.

A camera device 60 which includes platters of lenses and/or filters (61, 62, 63) is shown in FIG. 4. Camera device 60 includes a plurality of optical chain modules (optical chain module 1 69, optical chain module 2 70, . . . , optical chain module N 71), processor 72, memory 73, and display 74 coupled together via bus 75. In some embodiments, processor 72, memory 73, display 74, accelerometer module 94, zoom control module 91, and autofocus controller 92 of device 60 of FIG. 4 are the same as processor 110, memory 108, display 102, accelerometer module 122, zoom control module 140, and autofocus controller 132 of device 100 of FIG. 1A.

Element 61 represents a platter of outer lenses L1 with 3 of the lenses (77, 81, 86) being shown as in the FIG. 1C example. Additional lenses may be, and often are, included on the platter 61 in addition to the ones shown. For example, in a seven optical chain module embodiment such as shown in FIG. 1, platter 61 would include seven outer lenses. Note that the thickness of the platter 61 need not exceed the maximum thicknesses of the lenses and from a side perspective is much thinner than if a single lens having a similar curvature to that of the individual lenses L1, but with the single lens being larger, occupied the same area as all the 7 lenses on the platter 61. Platter 62 includes the filters F, which include the three filters (77, 82, 87) while platter 63 includes the inner lenses L2, which include the three lenses (78, 83, 88). As can be appreciated the camera device 60 is the same as or similar to the camera device of FIG. 1C and FIG. 2 but with the lenses and filters being mounted on platters which may be moved between the front and back of the camera to support autofocus or horizontally and/or vertically to support lens/filter changes.

Auto focus drive 66 is used to move platter 63 forward or backward as part of a focus operation, e.g., under control of the autofocus controller 76 which may be, and often is, included in the camera device 60. A filter shift drive (FSD) 65 is included in embodiments where shifting of the platter 62 is supported as part of a filter change operation. The FSD 65 is responsive to the processor 72 which operates in response to user selection of a particular mode of operation and/or an automatically selected mode of operation and can move the platter 62 vertically, horizontally or in some combination of vertical and horizontal motion to implement a filter change operation. The FSD 65 may be implemented with a motor and mechanical linkage to the platter 62. In some embodiments, the platter 62 may also be rotated to support changes. The rotation may be an off center rotation and/or may be performed in combination with one or more other platter position changes.

A lens drive (LD) 67 is included in various embodiments where shifting of the platter 63 is supported. The LD 67 works under the control of the zoom control module 91 included in the camera device 60 and can move the platter 63 vertically, horizontally or in some combination of vertical and horizontal motion to implement a lens shifting, adjustment and/or a lens change operation, e.g., as part of a zooming operation. The LD 67 may be implemented with a motor and mechanical linkage to the platter 63. In some embodiments, the platter 63 may also be rotated to support changes. The rotation may be an off center rotation and/or may be performed in combination with one or more other platter position changes.

Figure 5A:
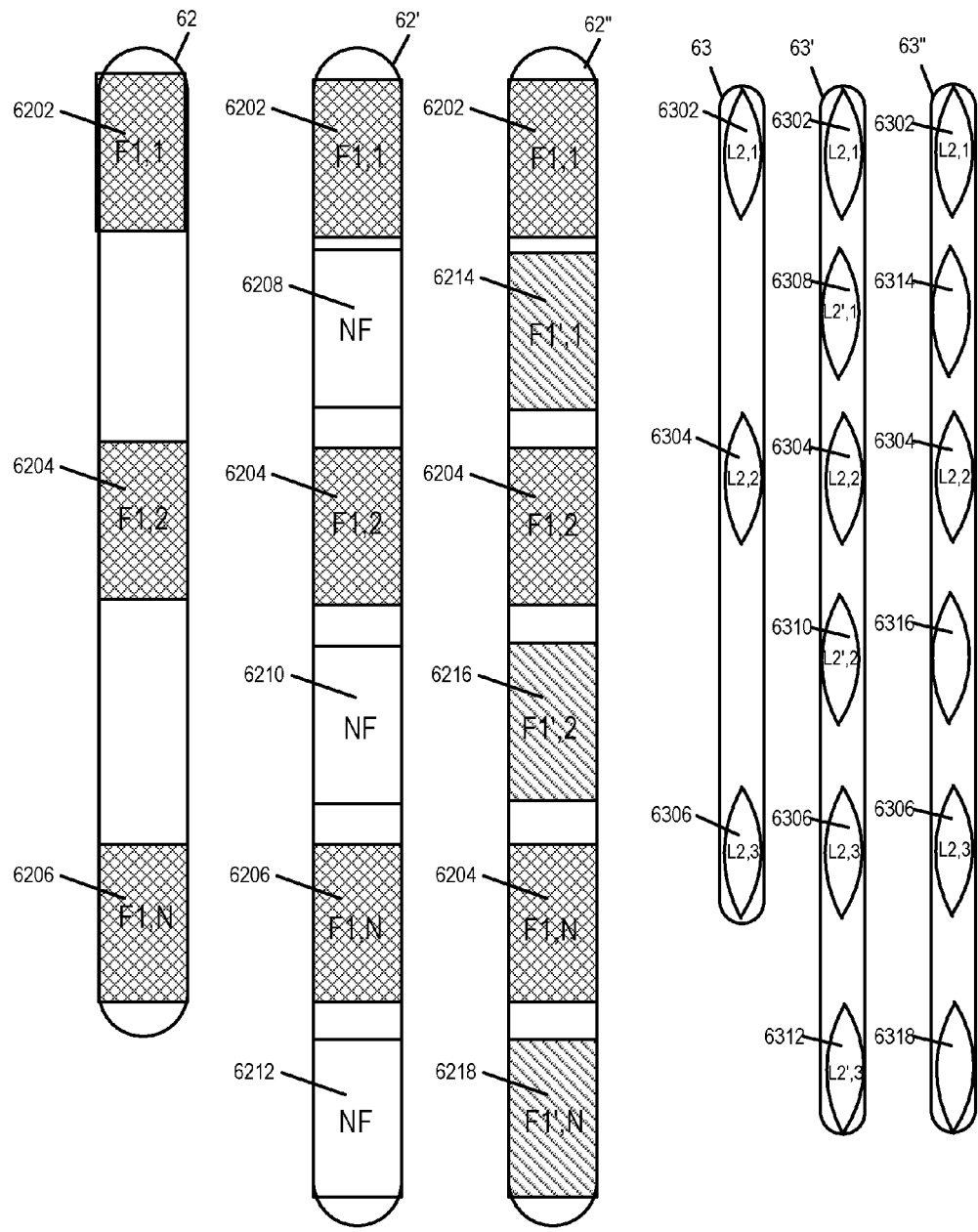
FIG. 5A illustrates various filter and lens platters that may be used in the camera device shown in FIG. 4 depending on the particular embodiment.
Figure 5B:
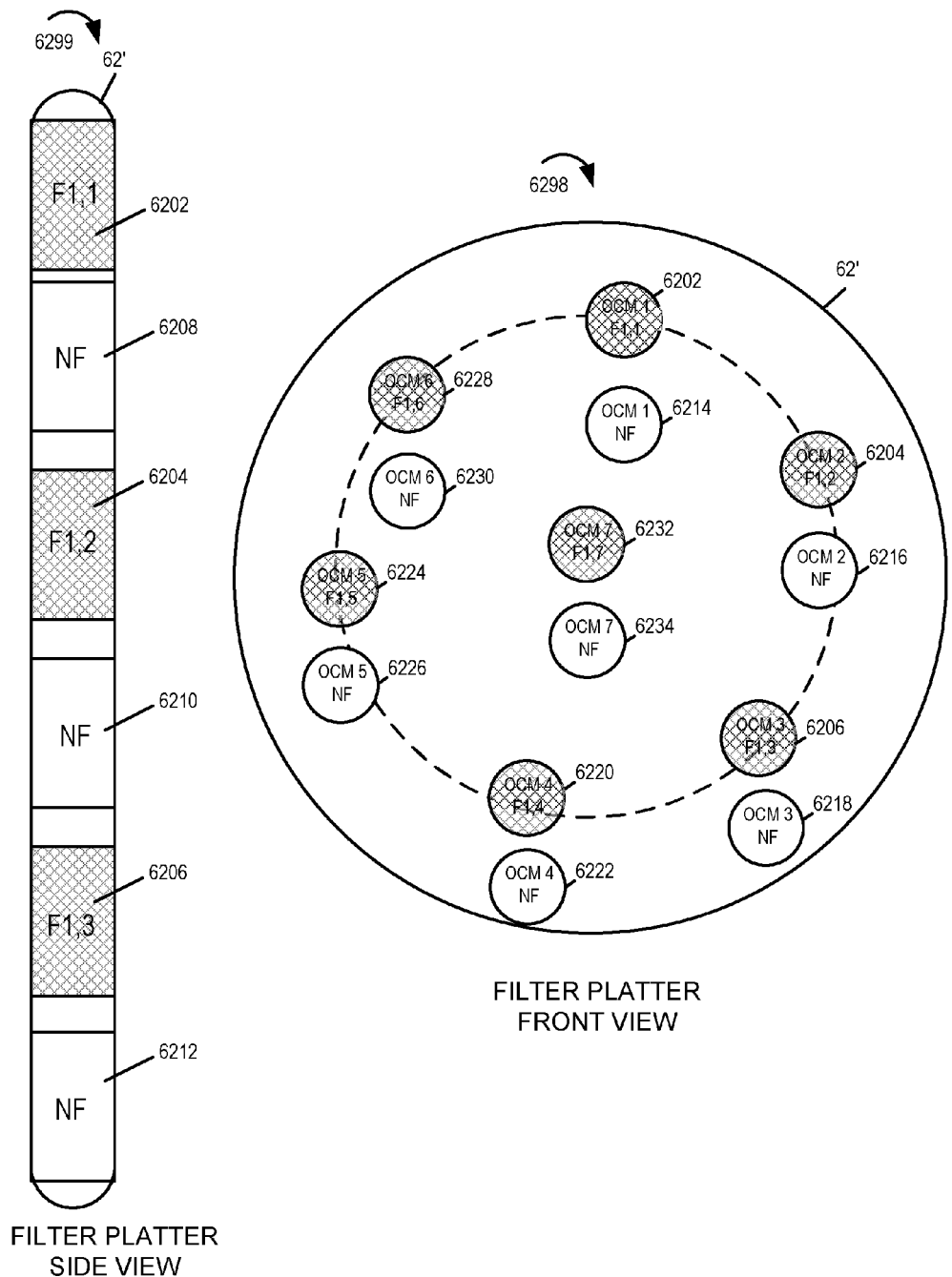
FIG. 5B illustrates the filter platter arrangement shown in FIG. 5A when viewed from the side and when viewed from the front.

FIG. 5A illustrates various exemplary platters that can, and in some embodiments are, used as the filter platter and/or inner lens platter in the camera device 60 of FIG. 4. In the FIG. 5A example N is three (3) but other values of N are possible depending on the embodiment. FIG. 5B shows the exemplary lens platter 62' of FIG. 5A when viewed from the side, drawing 6299, and from the front, drawing 6298.

Platter 62 represents a platter with a single set of filters F1,1 6202 corresponding to OCM1, F1,2 6204 corresponding to OCM 2 and F1,3 6206 corresponding to OCM 3.

Platter 62' represents an alternative platter that can, and in some embodiments is, used in place of platter 62. NF is use to represent a hole or No Filter (NF) area of the platter 62'. As should be appreciated by simply shifting platter 62' vertically the filters F1 (F1, 1 6202, F1, 2 6204, F1, 3 6206) can be replaced by holes (NF 6208, NF 6210, NF 6212), respectively, thereby removing the color or other types of filters previously included in the optical chain modules.

Platter 62" of FIG. 5A represents a platter which includes alternative filters F1' (F1', 1 6214, F1', 2 6216, F1' 3 6206) which can be switched for the filters F1 (F1, 1 6202, F1, 2 6204, F1,3 6206), respectively, by moving the platter 62" vertically. Thus platter 62" is used to show how filters can be switched for other filters by simple movement of a platter while platter 62' shows how filters can be removed from the optical paths included in a plurality of optical chain modules by shifting of the platter on which a set of filters are mounted.

With regard to drawing 6298 of FIG. 5B, as should be appreciated by simply shifting platter 62' vertically the filters F1 (F1, 1 6202, F1, 2 6204, F1, 3 6206, F1, 4 6220, F1, 5 6224, F1, 6 6228, F1, 7 6232) can be replaced by holes (NF 6208, NF 6210, NF 6212, NF 6222, NF 6226, NF 6230, NF 6234), respectively, thereby removing the color or other types of filters previously included in the optical chain modules.

Lens platter 63 shows a platter of inner lenses L2 (L2,1 6302, L2,2 6304, L2,3 6306) corresponding to first, second and third optical camera modules. Lens platter 63' is an alternative platter which shows how alternative lenses L2' (L2', 1 6308, L2',2 6310, L2',3 6312) can be included on a lens platter and easily swapped for the lenses L2 (L2,1 6302, L2,2 6304, L2,3 6306), respectively, by simple movement of the platter 63' vertically or horizontally. Lens platter 63" is used to show that a lens platter may include holes (6314, 6316, 6318) as an alternative to alternative lenses. Any of lens platters 63, 63' or 63" could be used in the camera device 60 shown in FIG. 4. While two lens sets are included in platter 63', multiple lens and/or hole combinations, e.g., 2, 3 or more, may be included in a single platter. Similarly a large number of alternative filter, hole alternatives may be supported in a single filter platter. A platter can also have combinations of lenses, filters and holes and filters could be swapped for lenses or holes.

As should be appreciated given the larger number of lens/filter combinations that can be supported through the use of platters, a single camera device including a number of optical chain modules may support a large number of alternative modes of operation. It should be appreciated that the exposure control of various optical chain modules may be varied along with the filters and/or lenses used at any given point in time allowing for a wide degree of flexibility and control over the images captured at any given point in time.

Figure 6A:
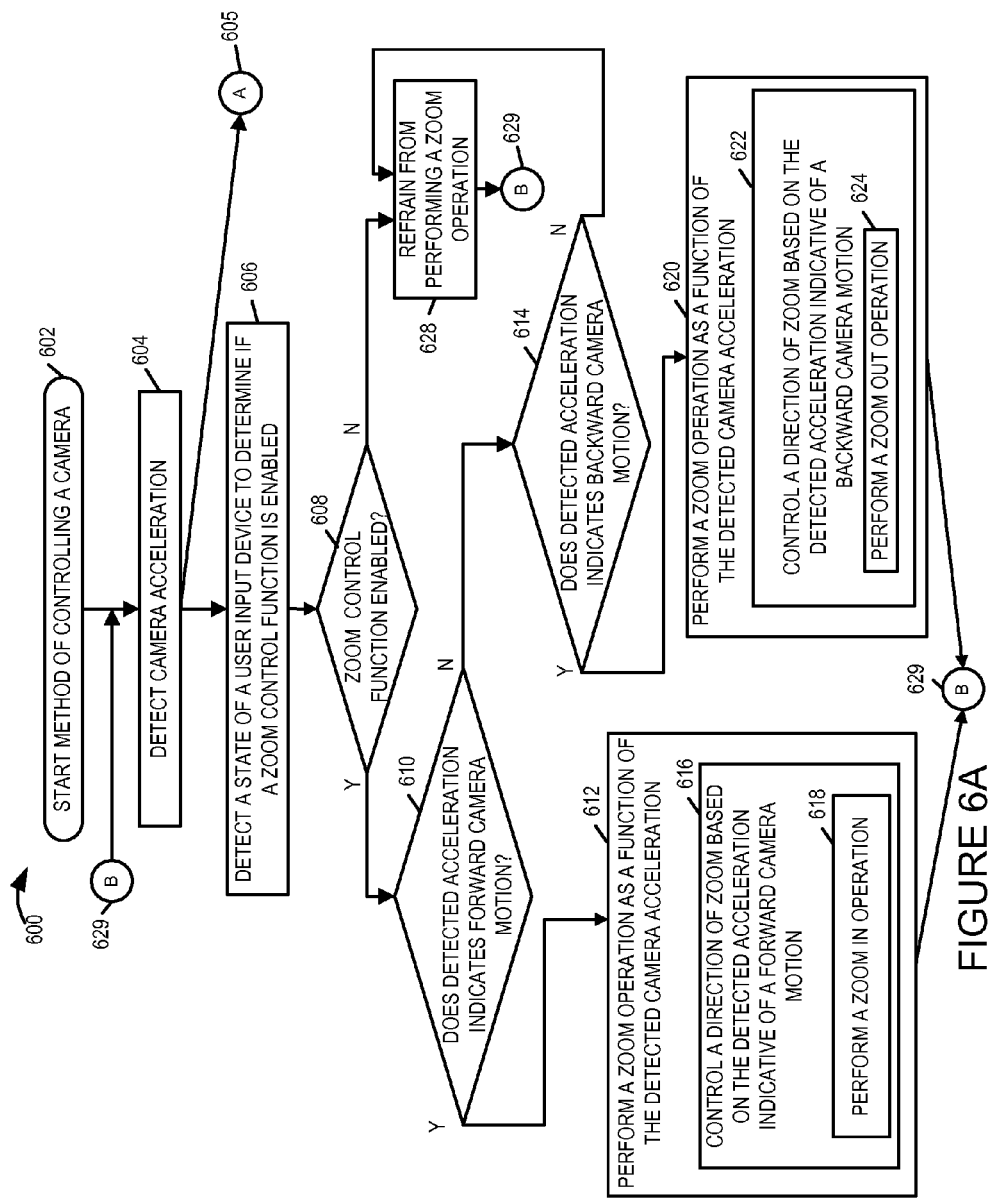
FIG. 6A illustrates a first part of a flowchart showing the steps of an exemplary method of controlling a camera device in accordance with an exemplary embodiment.

FIG. 6, comprising the combination of FIGS. 6A and 6B, illustrates a flowchart 600 showing the steps of an exemplary method of controlling a camera device in accordance with an exemplary embodiment of the invention. The method of flowchart 600 can be, and in some embodiments is, performed using a camera device such as the camera 100 of FIG. 1A. The exemplary method starts in step 602 where the camera is powered on and initialized. Operation proceeds from step 602 to step 604. In step 604 camera acceleration is detected. In various embodiments the camera acceleration in direction is detected by an accelerometer device, e.g., such as the accelerometer module 122. In some embodiments the detected acceleration is indicative of one of a forward camera motion or a backward camera motion. However detection of acceleration in other directions is also possible using various accelerometers included in the accelerometer module.

Operation proceeds from step 604 to step 606 and from step 604, via connecting node A 605 to step 656. In step 606 the state of a user input device is detected to determine whether a zoom control function of the camera is enabled or disabled. In some embodiments the user input device is a button on the camera or a camera support device, e.g., a first button 195 on camera 100 or a first button 924 on camera support device 900. In some such embodiments a depressed state of the first button indicates that camera control function is enabled and an undepressed state of the first button indicates that camera zoom control function is not enabled. In some embodiments the camera includes a zoom control function state detection device, e.g., zoom control function input state detection module 148, that detects whether the input device, e.g., the first button, is in undepressed or depressed state to determine whether zoom is enabled or not enabled. In some other embodiments the user input device is a touch sensor, e.g., a first touch sensor, e.g., touch sensor 199 or touch sensor 197. In such embodiments a finger on the first touch sensor indicates a state of the input device in which the zoom control function is enabled. In some embodiments as long as the touch sensor, e.g., the first touch sensor, detects a touch, the state of the user input device is considered to indicate that the zoom control function is enabled. In some embodiments the zoom control function input device state detection module, e.g., module 148, monitors the state of the touch sensor, e.g., the first touch sensor, and when the touch sensor is touched the zoom control input state detection module receives a signal from the touch sensor indicating zoom control function is enabled state, otherwise when the sensor is not touched the state is considered to be a zoom control function disabled state. In some embodiments, the zoom control function state remains in an enabled state for a predetermined time interval after the touch sensor, e.g., touch sensor 199 or 197 is touched.

Operation proceeds to step 608. In step 608 it is determined whether the camera zoom control function is enabled based on the detected state of the input device, e.g., the first input device. If it is determined that zoom control function is not enabled the operation proceeds from step 608 to step 628 where the camera device is controlled not to perform a zoom operation. If it is determined that zoom control function is enabled the operation proceeds from step 608 to step 610.

In step 610 it is determined whether or not the detected acceleration indicates a forward camera motion. If the detected acceleration indicates a forward camera motion the operation proceeds from step 610 to step 612. In step 612 a zooming operation is performed as a function of the detected camera acceleration. In various embodiments sub steps 616 and 618 are performed as part of performing step 612. In step 616 a zoom control device, e.g., zoom control module 140, of the camera controls the direction of based on the detected acceleration indicative of a forward camera motion. In accordance with one aspect of some embodiments of the invention when a forward camera motion is detected a zoom in operation is performed. Accordingly, in step 618 the zoom control device performs a zoom in operation, e.g., zooming in on an object and/or area of interest.

If in step 610 it is determined that the detected acceleration does not indicate a forward camera motion the operation proceeds from step 610 to step 614. In step 614 it is determined if the detected acceleration indicates a backward camera motion. If the detected acceleration indicates a backward camera motion then operation proceeds from step 614 to step 620. In step 620 a zoom operation is performed as a function of the detected camera acceleration. In various embodiments sub steps 622 and 624 are performed as part of performing step 620. In step 622 a zoom control device of the camera controls the direction of zoom based on the detected acceleration indicative of the backward camera motion. In accordance with one aspect of some embodiments of the invention when a backward camera motion is detected a zoom out operation is performed. Accordingly, in step 624 the zoom control device performs a zoom out operation, e.g., zooming out of an object and/or area.

If in step 614 the detected acceleration does not indicate a backward camera motion then operation proceeds from step 614 to step 628 where the camera device is controlled not to perform a zoom operation.

Returning to step 656, in step 656 the state of a user input device is detected to determine whether a focus control function of the camera is enabled or disabled. In some embodiments the user input device is a button on the camera or a camera support device, e.g., a second button 194 on camera device 100 or a second button 925 on camera support device 900. In some such embodiments a depressed state of the second button indicates that camera control function is enabled and an undepressed state of the second button indicates that camera focus control function is not enabled. In some embodiments the camera includes a focus control function state detection device, e.g., focus control function input state detection module 193, that detects whether the input device, e.g., the second button 194, is in undepressed or depressed state to determine whether focus control is enabled or not enabled. In some other embodiments the user input device is a touch sensor, e.g., a second touch sensor 198 or 196. In some such embodiments a finger on the second touch sensor indicates a state of the input device in which the focus control function is enabled. In some embodiments as long as the touch sensor, e.g., the second touch sensor 198 or 196, detects a touch, the state of the user input device is considered to indicate that the focus control function is enabled. In some embodiments the focus control function input device state detection module, e.g., module 193, monitors the state of the touch sensor, e.g., the second touch sensor, and when the touch sensor is touched the focus control input state detection module receives a signal from the touch sensor indicating focus control function is enabled state, otherwise when the sensor is not touched the state is considered to be a focus control function disabled state. In some embodiments, the focus control function state remains in an enabled state for a predetermined time interval after the touch sensor, e.g., touch sensor 198 or 196 is touched.

Operation proceeds to step 656. In step 658 it is determined whether the camera focus control function is enabled based on the detected state of the input device, e.g., the second input device. If it is determined that focus control function is not enabled the operation proceeds from step 658 to step 678 where the camera device is controlled not to perform a focus operation. If it is determined that focus control function is enabled the operation proceeds from step 658 to step 660.

In step 660 it is determined whether or not the detected acceleration indicates a forward camera motion. If the detected acceleration indicates a forward camera motion the operation proceeds from step 660 to step 662. In step 662 a focus operation is performed as a function of the detected camera acceleration. Step 662 includes step 666 in which the focus of the camera is altered based on the detected acceleration indicative of a forward camera motion. Step 662 includes step 668 in which the back focal distance is decreased, e.g., by focus control module 186.

If in step 610 it is determined that the detected acceleration does not indicate a forward camera motion the operation proceeds from step 660 to step 664. In step 664 it is determined if the detected acceleration indicates a backward camera motion. If the detected acceleration indicates a backward camera motion then operation proceeds from step 664 to step 670. In step 670 a focus operation is performed as a function of the detected camera acceleration. In various embodiments steps 672 and 674 are performed as part of performing step 670. In step 672 a focus of the camera is altered based on the detected acceleration indicative of the backward camera motion. In step 674 the back focal distance is increased, e.g., by focus control module 186.

If in step 664 the detected acceleration does not indicate a backward camera motion then operation proceeds from step 664 to step 678 where the camera device is controlled not to perform a focus control operation.

Operation proceeds from step 628, 612, 620, 678, 662, or step 670, via connecting node B 629 to step 604.

In some embodiments, velocity information is obtained from acceleration information, e.g., using integration, and position information is obtained from velocity information, e.g., using integration.

In some embodiments, if a user attempts to enable the zoom control function concurrently with the focus control function, e.g., by depressing both the zoom control function button and the focus control function button concurrently, the zoom control function with have precedent, e.g., the zoom control will be enabled and focus control function will not be enabled. In some embodiments, if a user attempts to enable the zoom control function concurrently with the focus control function, e.g., by depressing both the zoom control function button and the focus control function button concurrently, both the zoom control function and the focus control function will not be enabled. In some embodiments, if one of the zoom control function and the focus control function is in an enabled state, user input attempting to enable the other one of the zoom control function and the focus control function is not accepted while the one of the zoom control function and the focus control function remains in an enabled state.

In some embodiments, an exemplary method of controlling a camera, comprises: detecting camera acceleration; and performing one of a zoom operation or a focus operation as a function of the detected camera acceleration. In some embodiments, said detected acceleration is indicative of one of a forward camera motion or a backward camera motion; and performing one of a zoom operation or a focus operation includes controlling a direction of zoom based on whether the acceleration is indicative of a forward or backward camera motion or altering a focus of the camera based on whether the acceleration is indicative of a forward or backward motion.

In some embodiments, performing one of a zoom operation or a focus operation includes performing a zoom in operation when the detected acceleration is indicative of a forward camera motion. In some such embodiments, performing one of a zoom operation or a focus operation includes performing a zoom out operation when the detected acceleration is indicative of a backward camera motion.

In some embodiments, performing one of a zoom operation or a focus operation includes performing a focus adjustment operation which decreases the back focal distance when the detected acceleration is indicative of a forward camera motion. In some such embodiments, performing one of a zoom operation or a focus operation includes performing a focus adjustment operation which increases the back focal distance when the detected acceleration is indicative of a backward camera motion.

In some embodiments, the exemplary method further comprises detecting a state of a first user input device to determine if a zoom control function is enabled, said step of performing a zoom operation being performed as a function of the detected camera acceleration when the state of said first user input device indicates zoom operation is enabled but not when said state of the first user input device indicates that the zoom operation is not enabled.

In some embodiments, said first user input device is a first button on said camera or a camera support device used to enable the zoom control function. In some such embodiments, a depressed state of said first button indicates that the camera zoom control function is enabled and an undepressed state of said first button indicates that camera zoom control function is not enabled.

In some embodiments, said first user input device is a first touch sensor, a finger on said first touch sensor indicating a state in which said zoom control function is enabled.

In some embodiments, the method further comprises: detecting a state of a second user input device to determine if a focus control function is enabled, said step of performing a focus control operation being performed as a function of the detected camera acceleration when the state of said second user input device indicates that the focus control function is enabled but not when said state of the second user input device indicates that the focus control function is not enabled. In some such embodiments, said second user input device is a second button on said camera or a camera support device used to enable the focus control function. In some such embodiments, a depressed state of said second button indicates that the camera focus control function is enabled and an undepressed state of said second button indicates that camera zoom control function is not enabled.

In some embodiments, said second user input device a second touch sensor, a finger on said second touch sensor indicating a state in which said camera focus control function is enabled.

An exemplary camera device, e.g., camera device 100 of FIG. 1A, in accordance with some embodiments, comprises: an accelerometer module, e.g., module 122, configured to detect camera acceleration; and at least one of: a zoom control module, e.g., module 140. configured to perform a zoom operation as a function of the detected camera acceleration or a focus control module, e.g., module 186 configured to perform a focus operation as a function of detected camera acceleration.

In some embodiments, said detected acceleration is indicative of one of a forward camera motion or a backward camera motion; and said zoom control module is configured to control a direction of zoom based on whether the acceleration is indicative of a forward or backward camera motion as part of performing a zoom operation.

In some embodiments, said detected acceleration is indicative of one of a forward camera motion or a backward camera motion; and said focus control module is configured to alter the focus of the camera based on whether the acceleration is indicative of a forward or backward camera motion as part of performing a focus operation.

In some embodiments said zoom control module is configured to perform a zoom in operation when the detected acceleration is indicative of a forward camera motion. In some such embodiments, said zoom control module is configured to perform a zoom out operation when the detected acceleration is indicative of a backward camera motion.

In some embodiments, said focus control module is configured to decrease camera back focal distance when the detected acceleration is indicative of a forward camera motion. In some such embodiments, said focus control module is configured to increase camera back focal distance when the detected acceleration is indicative of a backward camera motion.

In some embodiments, said camera further comprises: a first input device state detection module, e.g., module 148, configured to detect a state of a first user input device to determine if a zoom control function is enabled; and said zoom control module is configured to perform a zoom operation as a function of the detected camera acceleration when the first input device state detection module detects that the state of said first user input device indicates that zoom control function is enabled but not when said state of the first user input device indicates that the zoom control function is not enabled. In some such embodiments, said first user input device is a first button, e.g., zoom control function button 195, on said camera device or a camera support device. In some such embodiments, a depressed state of said first button indicates that camera zoom control function is enabled and an undepressed state of said first button indicates that camera zoom control function is not enabled. In some embodiments, said first user input device is a first touch sensor, e.g., zoom control function touch sensor 199 or 197, and a finger on said first touch sensor being a state in which said zoom control function is enabled. In some embodiments, said first user input device is a first touch sensor, e.g., zoom control function touch sensor 199 or 199, and a finger on said first touch sensor is used to trigger a transition to a state in which said zoom control function is enabled.

In some embodiments, the camera device further includes a second input device state detection module, e.g., module 193, configured to detect a state of a second user input device to determine if a focus control function is enabled; and said focus control module, e.g., module 186, is configured to perform a focus operation as a function of the detected camera acceleration when the second input device state detection module detects that the state of said second user input device indicates that the focus control function is enabled but not when said state of the second user input device indicates that the focus control function is not enabled. In some such embodiments, said second user input device is a second button on said camera device or a camera support device, e.g., button 194 on camera device 100 or button 925 on camera support 900. In some such embodiments, a depressed state of said second button indicates that the focus control function is enabled and an undepressed state of said second button indicates that the focus control function is not enabled.

In some embodiments, said second user input device is a second touch sensor, e.g., focus control touch sensor 198 or 196, a finger on said second touch sensor being a state in which said focus control function is enabled. In some embodiments, said second user input device is a second touch sensor, e.g., focus control function touch sensor 198 or 196, and a finger on said second touch sensor is used to trigger a transition to a state in which said focus control function is enabled.

FIG. 7 illustrates a front view 700 of an exemplary camera apparatus 702 implemented in accordance with an exemplary embodiment of the present invention. The camera apparatus may include the same or similar elements as the camera device 100 shown in FIG. 1A. In the FIG. 7 example the sensor 704 is shown using dashed line since it is internal to the camera. Light reaches the sensor 704 via lens 750. In the case of a rolling shutter, the sensor 704 would begin reading out towards the top of the sensor 704 with the Nth readout occurring towards the bottom of the sensor. Thus, the top the image will be captured at an earlier point in time than the bottom portion of the image captured by sensor 704 as a result of the use of a rolling shutter 150.

FIG. 8 illustrates a rear view 800 of the exemplary camera apparatus 702. A touch display 704 is visible from the rear of the camera and can be used to view images captured by the camera 702 as well as to control the camera device via touch input.

Figure 9:
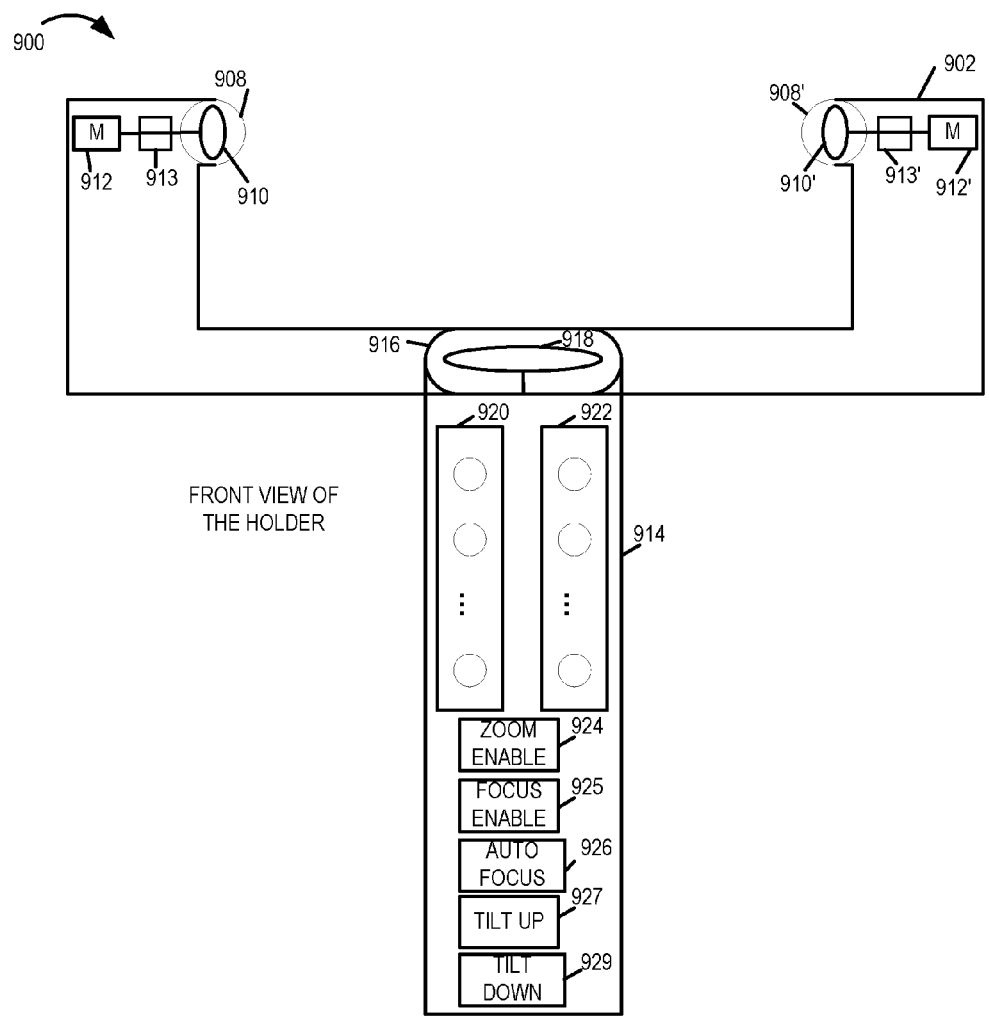
FIG. 9 illustrates a front view of an exemplary camera holder implemented in accordance with an exemplary embodiment.

FIG. 9 illustrates a front view of an exemplary camera holder 900 implemented in accordance with an exemplary embodiment of the present invention. The camera holder includes a support fork 902 and a handle 914. The camera may be inserted into mounts 910, 910' which may be implemented as slotted holders, clamps or another type of mount suitable for holing the camera 702. The mounts 910, 910' are included in pivots 908, 908' as shown in FIG. 9 which allow the mounts 910, 910' to rotate relative to the position of the support fork 902. The mounts 910, 910' are coupled to motors 912, 912', respectively, which are controlled as a function of accelerometer information received from the camera 702 when it is inserted to the support device 900 and, optionally, from accelerator input from an accelerometer module included in the support handle 914 and/or support fork 902. The support fork 902 can rotate relative to the handle 914 via the drive gear or pivot 918 driving the position of the fork 902 which is secured to the handle via rotatable connector 916. Also shown in the drawing are the rotation sensors 913, 913' between the motor and mounts 910, 910'. The rotation sensors 913, 913' are used in some embodiments to detect the amount of rotation/tilt of the camera 702 around X axis when the camera 702 is secured to the camera holder 900. The handle includes arrays of light emitters (920, 922), a zoom enable input 924, focus enable input 924, and a autofocus control 926. The zoom enable input 924, the focus control input 925, and autofocus input 926 may be implemented using buttons, touch sensors or another input device. In some embodiments, zoom enable input 924 is a zoom control function button, and focus enable input 925 is a focus control function button. In some embodiments, zoom enable input 924 is a zoom control function touch sensor, and focus enable input 925 is a focus control function touch sensor. The inputs 924, 925, 926 supplement control inputs on the camera 702 and can be used in place of the inputs on the camera 702 when the camera is mounted in the movable support arm 902.

The camera 702 is stabilized while in the support arm so that a user's tilting of the handle 914 or rotating of the handle 902 leaves the camera position unchanged and, e.g., facing forward in a consistent direction even as the user may lean or turn left or right. Accordingly through the use of the accelerometer controlled motors many hand movements which might interference with quality image capture can be compensated for and the effect on the camera position minimized as images are captured, e.g., over a period of time as part of capturing video or sequential still images. The stabilization process may be automatically enabled when a user begins image capture and halted when the user stops capturing images via a camera control. In this way power can be conserved. The lights 920, 922 can be powered by batteries include din the support device 900 which also power the motors 912, 912'. While the stabilization may not affect user motion left or right, such changes in the image capture area are often intentional and not the result of unintentional jitter due to hand hold. Furthermore, to the extent that changes up and down or left and right are small and due to unintentional motion they can be compensated for through the use of controlled cropping and/or other image stabilization techniques.

Figure 10:
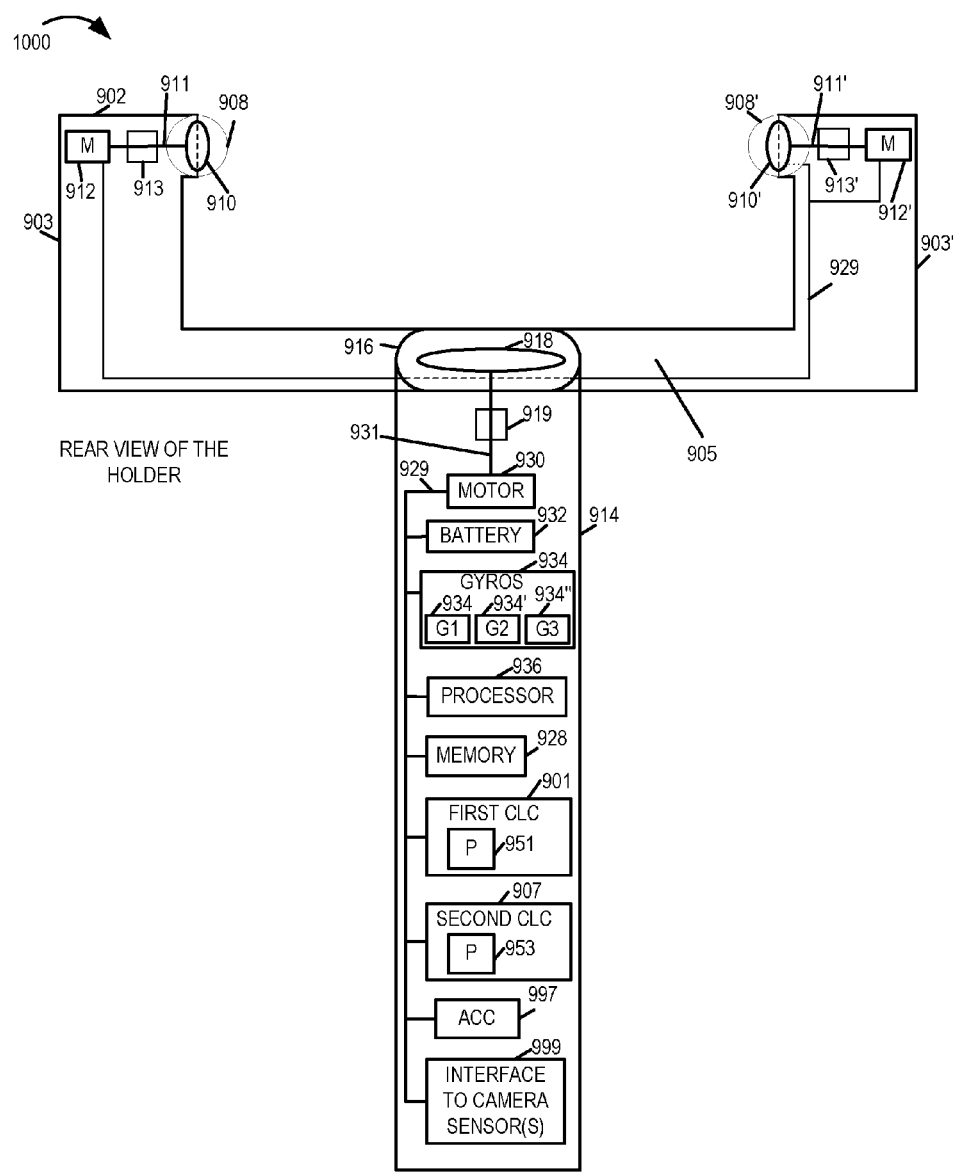
FIG. 10 illustrates a rear view of the exemplary camera holder with some elements of the holder being also shown.

FIG. 10 illustrates a rear view of an exemplary camera holder 1000 of FIG. 9 with some internal elements of the holder of FIG. 9 being also shown. In FIG. 10 it can be seen that a drive motor 930 is linked via drive linkage 931 to gear or pivot 918 and can cause the arm 902 to rotate in a circular fashion around the support handle 914 under control of the processor 936 which also controls operation of the motors 912 and 912' via bus 929. The rotation sensor 919 detects the amount of rotation of the arm 902 around the support handle 914. In some embodiments the rotation detected by rotation sensors 913, 913', 919 is provided to the processor 936 and may be used for controlling the drive motors 912, 912' and 930.' The bus 929 may be electrically connected to an interface on the camera 702 via the connection represented by dotted lines passing through movable mount 910'. The camera may receive power via the bus 929, e.g., from battery 932 located within support handle 914, and may also exchange information with the processor 936, including accelerometer output information allowing the orientation of the camera 702 to be known to the processor 936 and used in determining how to drive motors 912, 930 and 912' to maintain a consistent orientation of the camera 702 while images are being captured.

As shown in FIG. 10, the support device may include one or more gyroscopes 934 to help stabilize the camera support device and reduce unintentional motion which might occur due to hand motion. By resisting changes in position the gyros 934 act as a stabilizing device reducing the effect of unintentional jerking or force applied the support handle 914.

Figure 11:
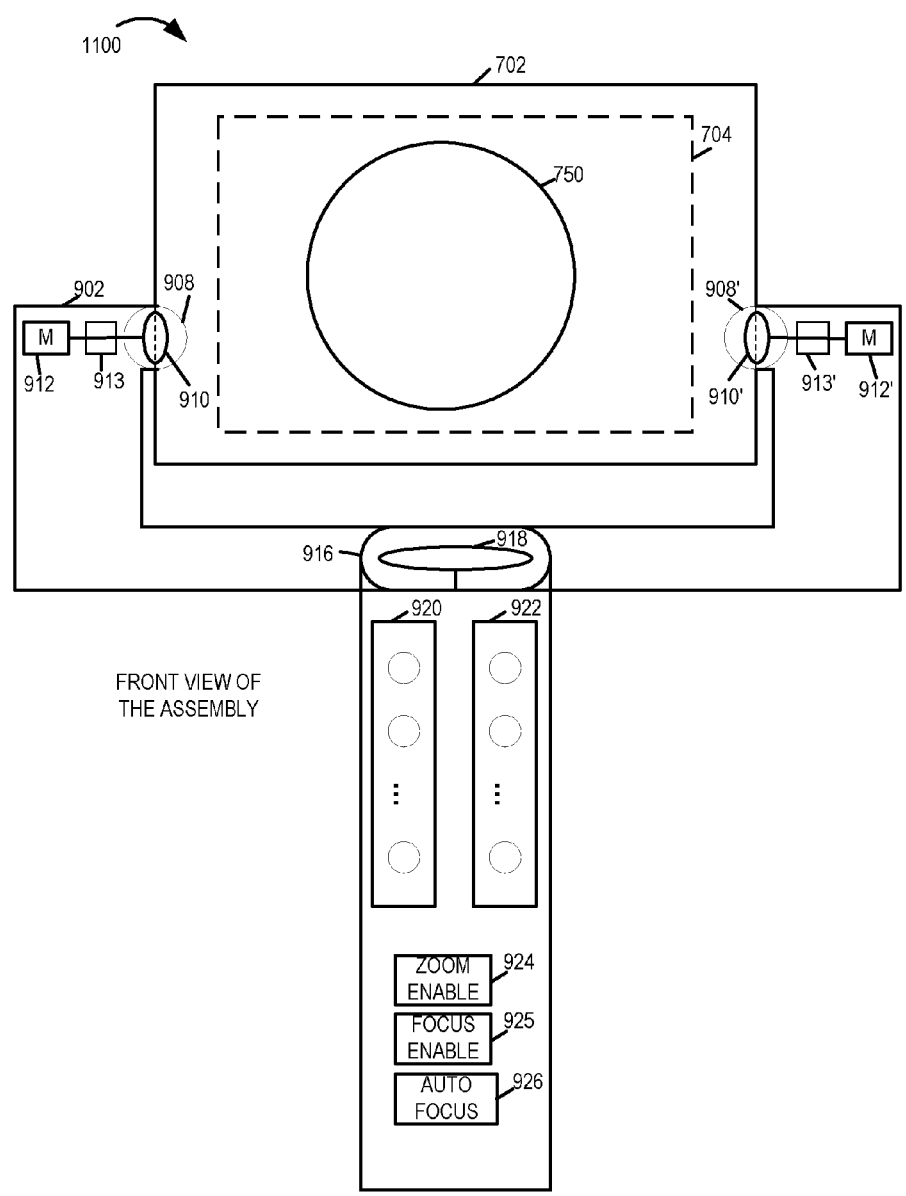
FIG. 11 illustrates a front view of an exemplary assembly including the exemplary camera and the camera holder, in accordance with an exemplary embodiment.

FIG. 11 is a front view 1100 of an exemplary assembly including the exemplary camera 702 and the camera holder shown in FIGS. 9 and 10 with the camera inserted into the holder, in accordance with an exemplary embodiment of the present invention.

Figure 12:
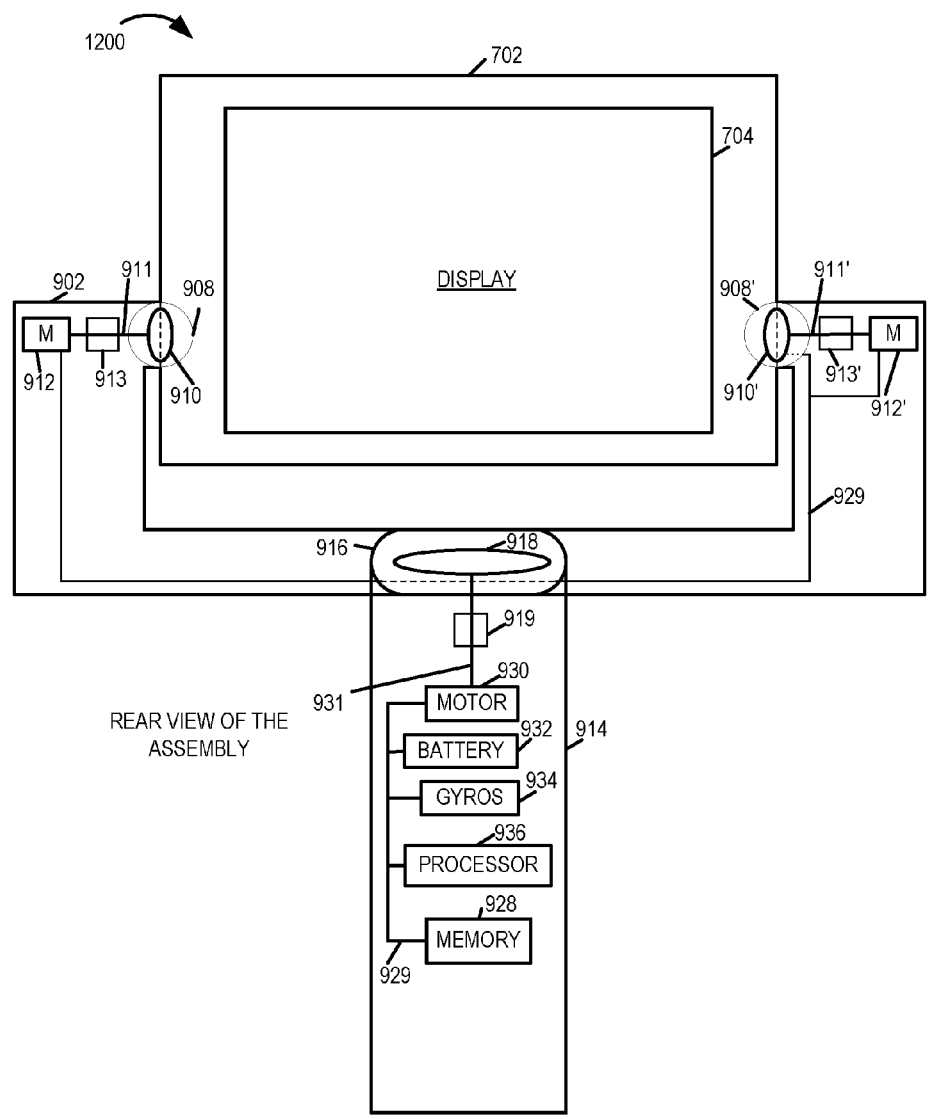
FIG. 12 illustrates a rear view of the exemplary assembly including the exemplary camera and the holder.

FIG. 12 illustrates a rear view 1200 of the exemplary assembly including the exemplary camera 702 and the holder shown in FIGS. 9 and 10 with the camera 702 inserted into the holder.

Figure 13A:
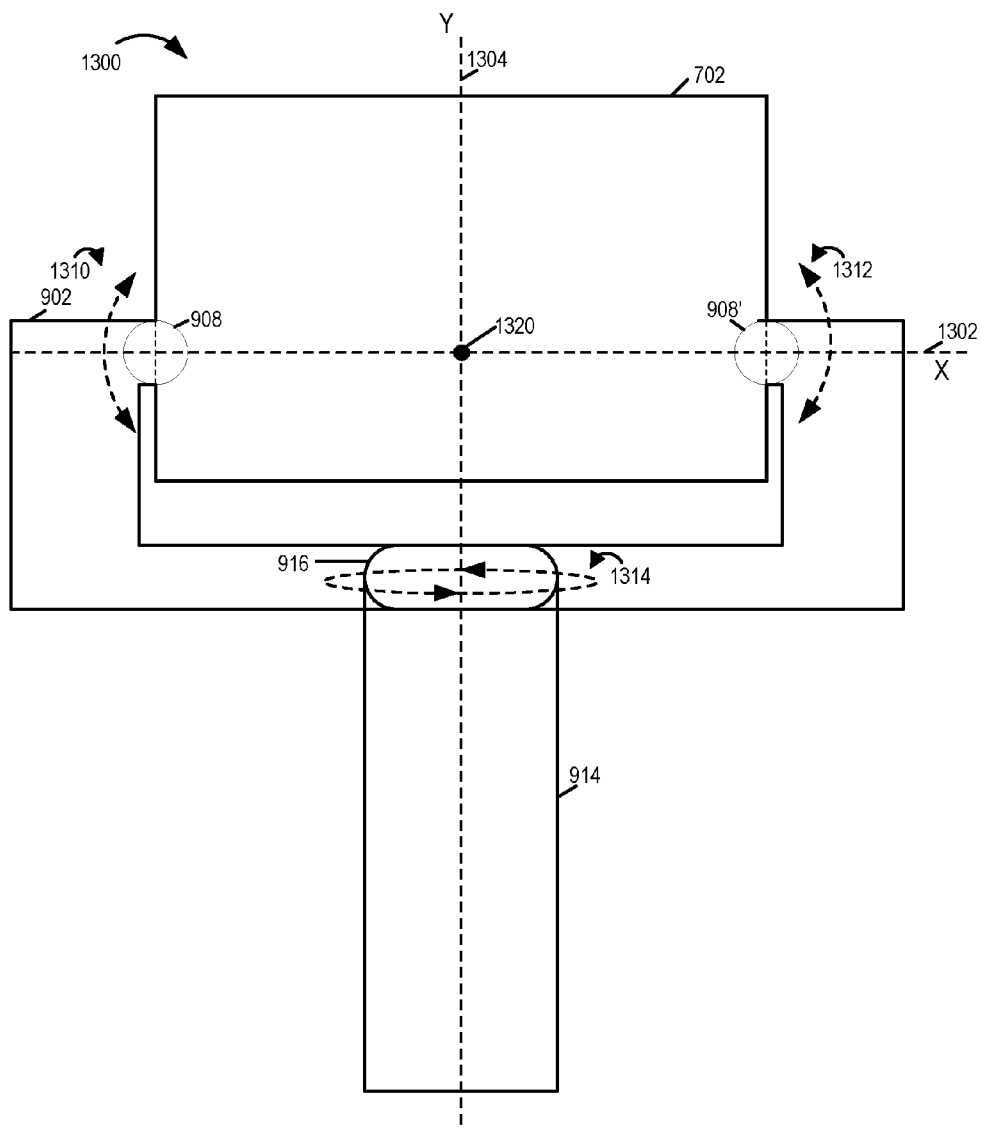
FIG. 13A illustrates a drawing showing how a camera mounted on the exemplary holder can rotate or tilt the camera as part of an automated stabilization operation performed in accordance with the features of one exemplary embodiment.

FIG. 13A is a drawing 1300 showing how a camera 702 mounted in the exemplary holder of FIG. 10 can move, under control of the processor, relative to the handle 914 and support arm 902. The support arm 902 can rotate 360 degrees relative to the axis, e.g., the vertical axis Y 1304, as shown by arrows 1314. The camera body 702 can rotate around the X axis 1302 as indicated by arrows 1310 and 1312. The center of mass 1320 of the camera 702 is indicated at the point of intersection of the X and Y axes in the drawing. While shown slightly below the center of the camera 702, it should be appreciated that the location of the axis and supports 908, 908' are positioned so that they are located at a balance point for the particular camera 702, based on the center of mass of the camera which is offset from the center of the camera, thereby reducing the amount of power needed to rotate the camera around the axis 1302 as may be necessary for image stabilization.

Figure 13B:
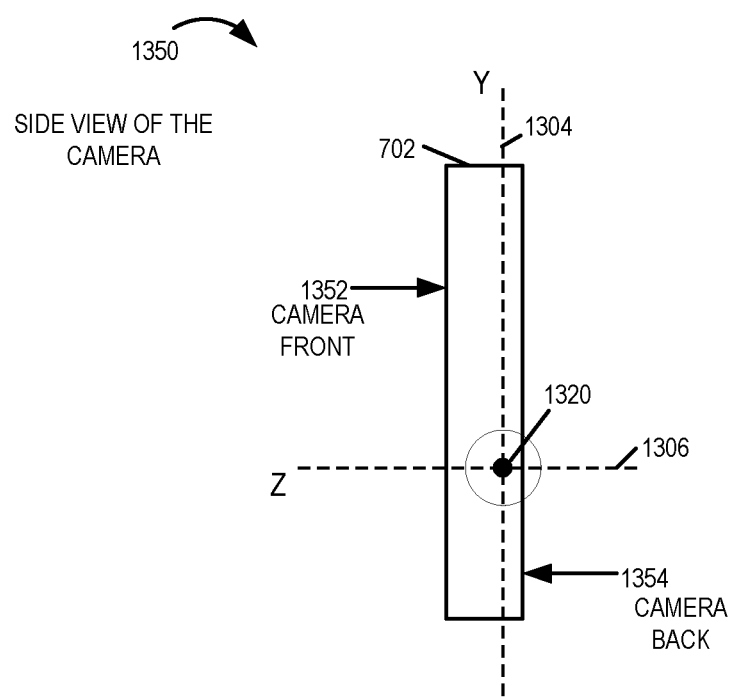
FIG. 13B is a drawing illustrating a side view of the camera shown in FIG. 13A with the center of mass of the camera being also shown in the drawing.

FIG. 13B is a drawing 1350 illustrating a side view of the camera 702 which is shown mounted on the camera holder in FIG. 13A. The front 1352 of the camera 702 as well as the back 1354 of the camera 702 are shown in the drawing 1350 to illustrate the relative location of the center of mass 1320 which lies closer to the back 1354 of the camera due to the distribution of the weight. Also shown in the side view 1350 of the camera are Y axis 1304 and Z axis 1306 which meet at the center of mass 1320. Again, note that for balance purposes the axis are arranged to pass through the center of mass.

It should be appreciated that a user may desire to tilt the camera 702 up or down and to have it then remain in a fixed position as images are captured at a particular angle. Up/down tilt controls in the form of buttons are included in the handle 914 in some embodiments. The user can control the tilt by pressing the tilt up 927 or tilt down 929 button until the desired camera angle is obtained and then the processor 936 will maintain that angle by controlling motors 912, 912' which are coupled via drive linkage 911, 911' to pivots or gears 910, 910' as shown in FIG. 11. While power is needed to maintain the user desired angle in cases where the user tilts the camera 702 around the X axis 1302, the design and construction of the camera 702 with the careful positioning of the center of mass 1320 allows for conserving power and minimizing power expenditure since the balanced nature of the camera's center of mass relative to the axis of the camera holder will result in little or no power to maintain a camera orientation.

Figure 14:
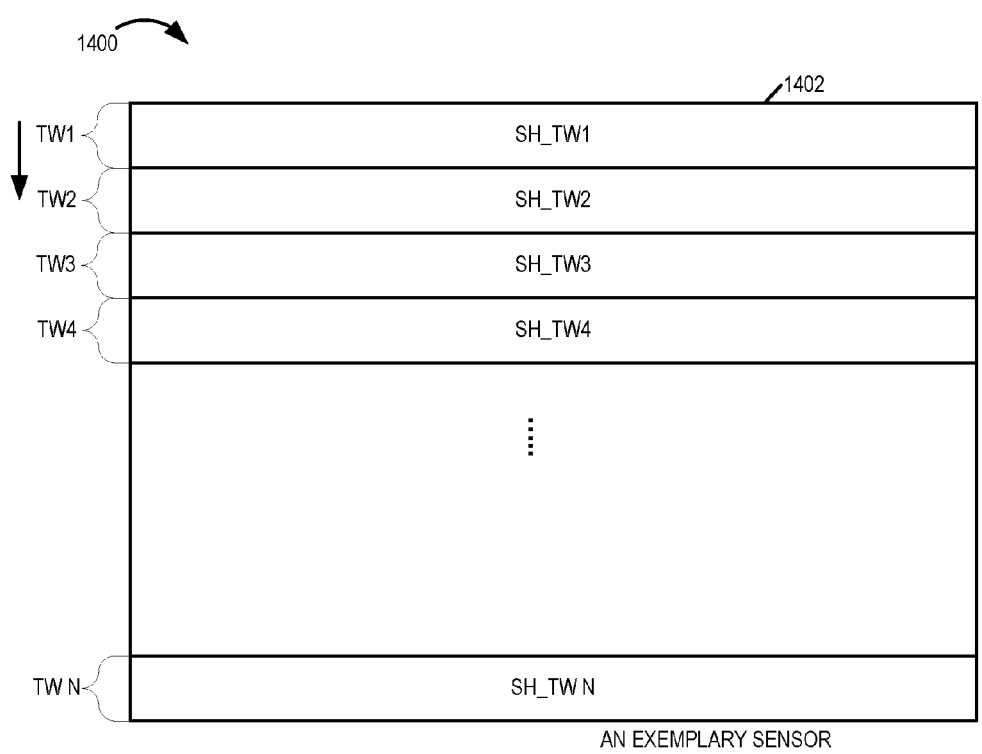
FIG. 14 illustrates an exemplary image sensor and the concept of how a rolling shutter controls sequential read out of different portions of the image sensor at different time periods.

FIG. 14 is a drawing 1400 illustrating an exemplary image sensor 1402 and the concept of how a rolling shutter controls sequential read out of different portions of the image sensor at different time periods. The read out of the first sensor portion will occur at the end of the time window TW1 while the readout of the last, i.e., Nth, sensor portion will occur at time period TW N. While the first sensor portion read out at the end of time period TW1 it should be appreciated that the sensor portion SH_TW1 will be reset at a time period preceding the end of TW1 by the desired exposure time period. Thus, sensor portion SH_TW1 will accumulate charge due to light exposure for a period of time equal to the desired exposure time before the read out occurs. Similarly the reset of the sensor portion SH_TW2 will occur at a time period which is determined based on the exposure time and the end of time period TW2 at which sensor portion will be read out. As a result of the use of the rolling shutter the image portions which are captured corresponding to different time periods.

As recognized by the present invention not all sensor portions are used in the image capture process at the same time when a rolling shutter is used. Thus, using energy to illuminate a portion of an area which is not being captured by a corresponding sensor area can be wasteful. As will be discussed below, lighting energy efficiencies can be achieved by controlling light emitter in a manner that is synchronized with the rolling shutter. In this way illumination of areas of scene which are not being captured while another portion of the scene is being captured can be reduced or avoided saving energy as compared to systems that continually illuminate an entire scene in a uniform manner.

Figure 15:
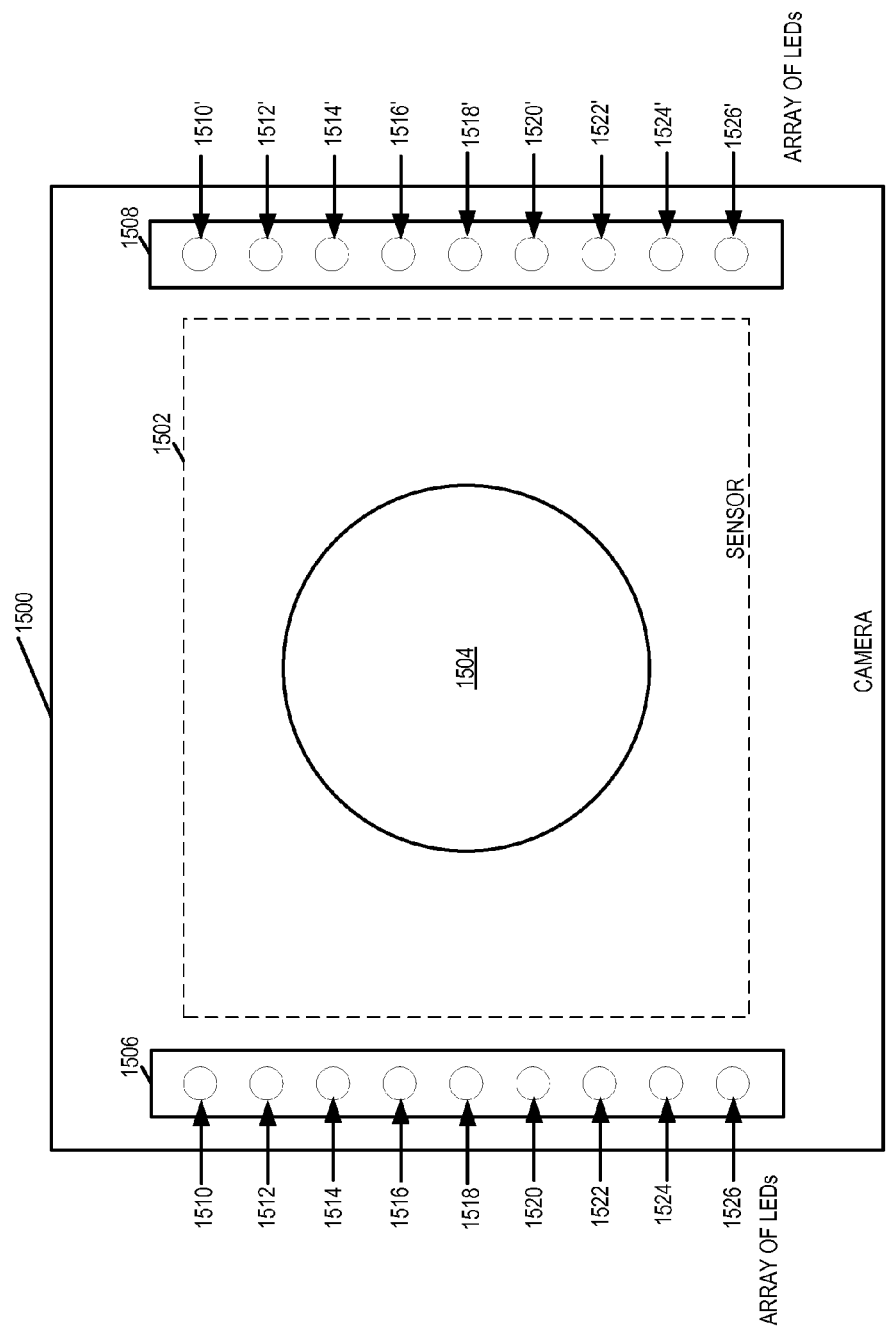
FIG. 15 illustrates an exemplary camera device including an exemplary image sensor such as the one illustrated in FIG. 14 and a plurality of light emitting elements.

FIG. 15 illustrates an exemplary camera device 1500 including an exemplary image sensor 1502 such as the one illustrated in FIG. 14, a lens 1504 and a plurality of light emitting elements 1510, 1512, 1514, 1516, 1518, 1520, 1522, 1524, 1526 and 1510', 1512', 1514', 1516', 1518', 1520', 1522', 1524', 1526' which form arrays 1506, 1508 respectively.

Figure 16:
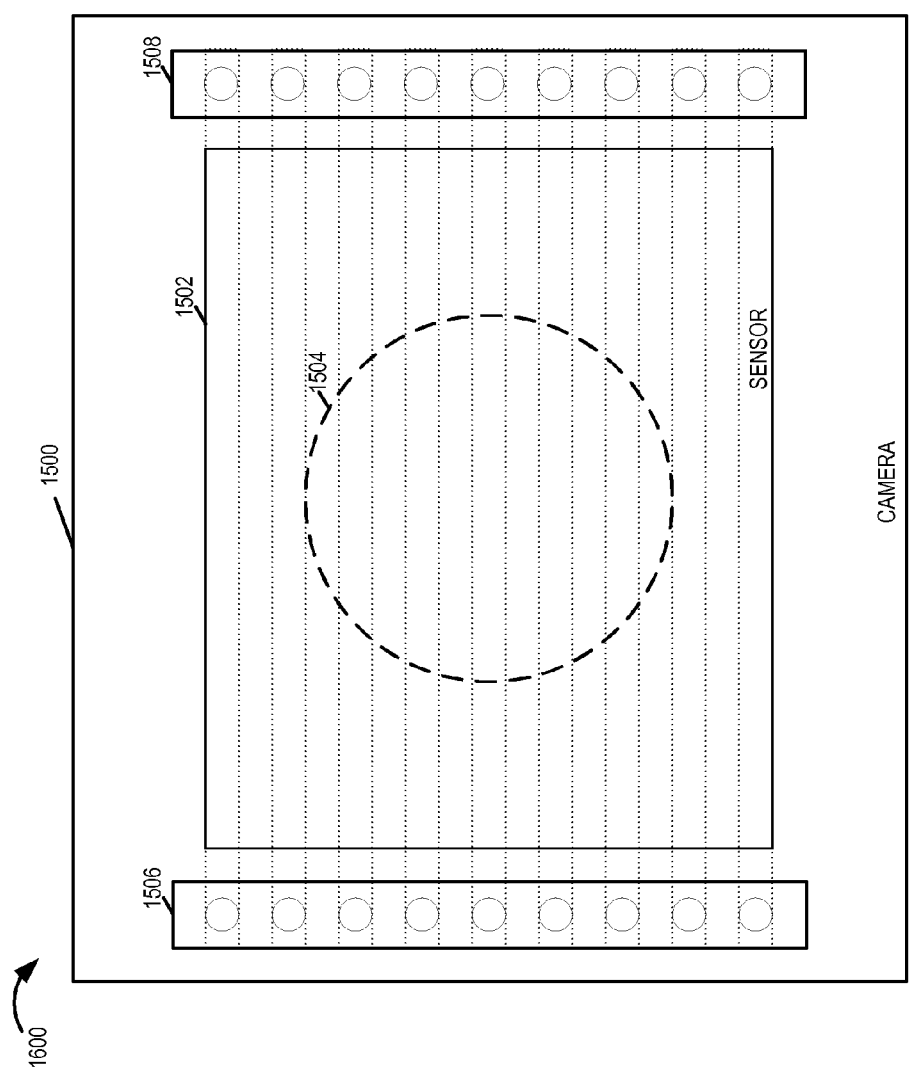
FIG. 16 is a drawing showing the exemplary camera of FIG. 15 and illustrating the concept of controlling different sets of light emitting elements at different times in a manner that is synchronized with the timing of a rolling shutter.

FIG. 16 is a drawing showing the exemplary camera of FIG. 15 and illustrating the concept of controlling different sets of light emitting elements at different times in a manner that is synchronized with the timing of a rolling shutter. The dotted lines are used to show how the lights correspond to in the FIG. 16 embodiment to roller shutter read out points in time on the sensor 1502. The lights of the arrays 1506 and 1508 corresponding to a portion of the sensor 1502 are activated while the corresponding sensor portion is intentionally being exposed prior to read out as part of the image capture process. Note that all the LEDs need not be illuminated at the same time with the illumination progressing from the top of the arrays 1506, 1508 to the bottom of the arrays as image exposure and sensor readout occur in the same direction with the activation of particular LEDs being coordinated with the operation of the rolling shutter and the controlled exposure of the sensor image areas. As should be appreciated, it may not be necessary to have the top LEDs active while the Nth sensor portion is being used to capture an image since the contribution to illuminating the area being observed by the Nth portion of the sensor may be relatively limited particularly in the case where lenses are used or the nature of the light emitter is relatively directional as is sometimes the case with LEDs.

Figure 17:
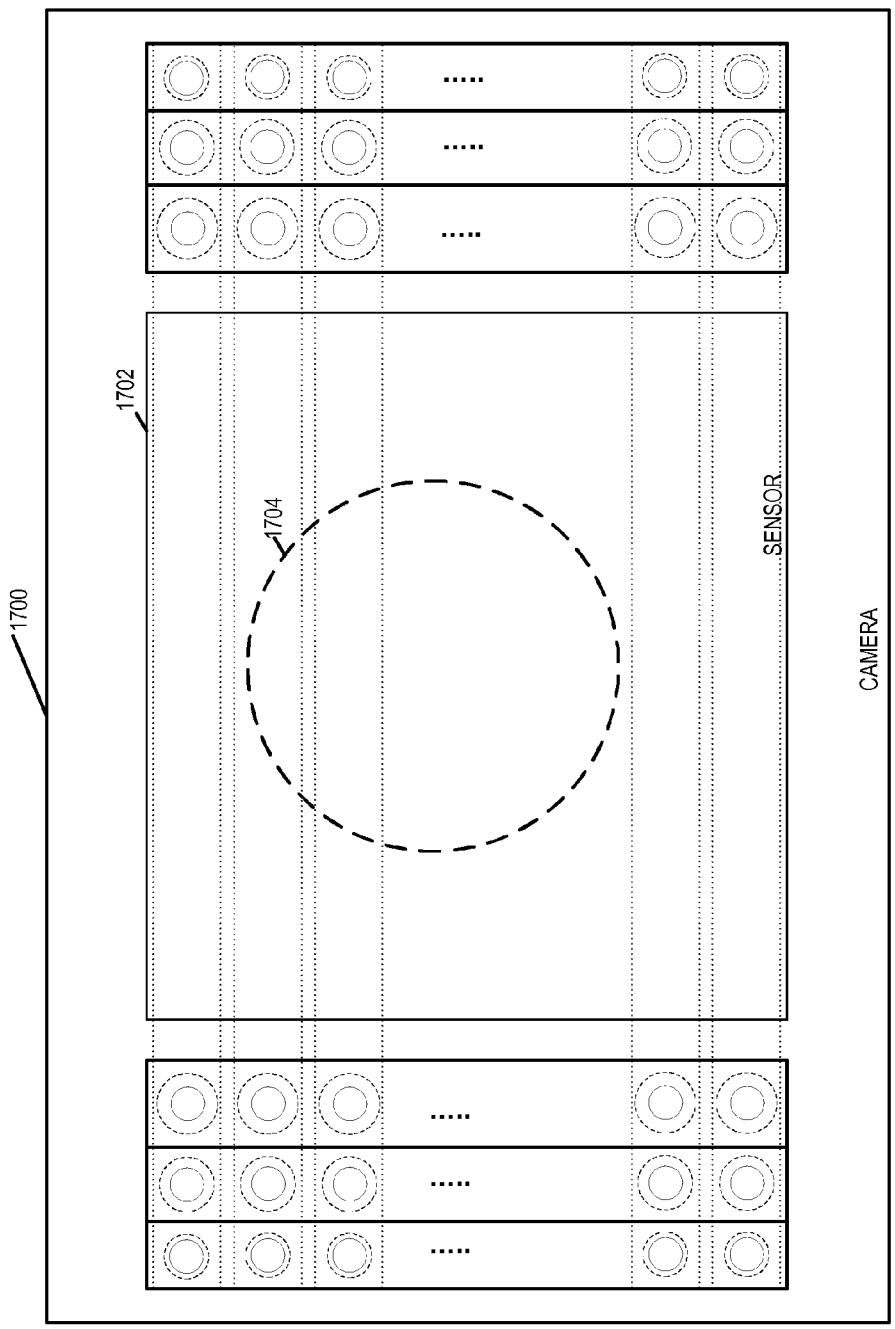
FIG. 17 illustrates another exemplary camera device including an exemplary image sensor and a plurality of arrays of light emitting elements with some of the light emitting elements being covered with different lenses.

FIG. 17 illustrates another exemplary camera device 1700 including an exemplary image sensor 1702, a lens 1704, and a plurality of arrays of light emitting elements with some of the light emitting elements being covered with different lenses. The solid circle in each of the light emitting arrays represents the light emitter while the circle shown using dashed lines represents a lens. In FIG. 17, three sets of different lens are used for the light emitters. Left and right light arrays are provided on each side of the camera 1700. In the FIG. 17 embodiment which arrays are used is selected based on the zoom or lens used to capture an image so that the illumination can be matched to the image area which will be captured.

In the FIG. 17 embodiment the array selected based on the focal length or lens being used to capture the image may, and in some embodiments is, operated in manner that is synchronized with operation of the rolling shutter use din the camera 1700.

Figure 18B:
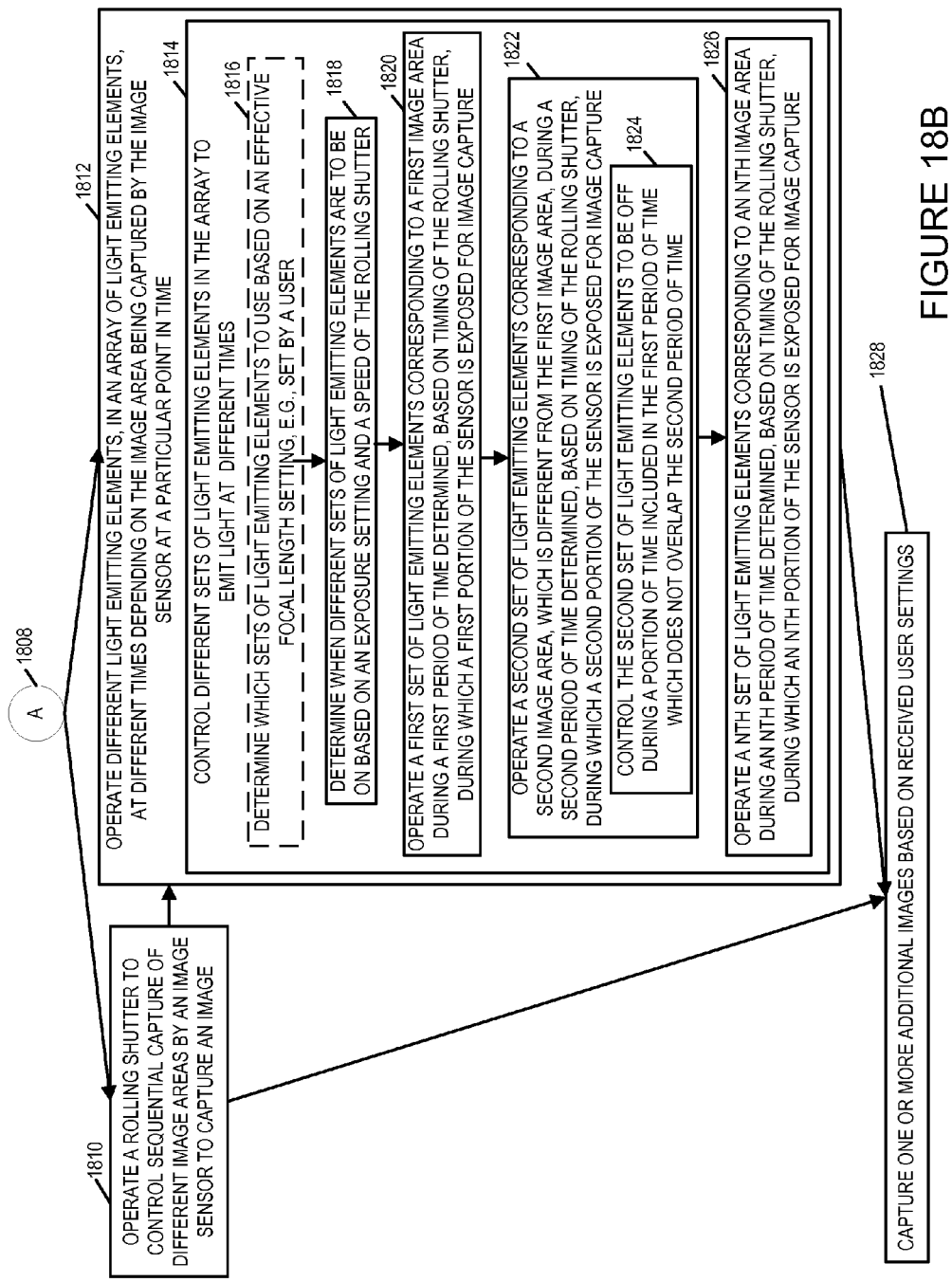
FIG. 18B illustrates a second part of a flowchart showing the steps of an exemplary method of controlling an imaging device in accordance with an exemplary embodiment of the invention.

FIG. 18 is a flowchart 1800 illustrating the steps of an exemplary method of controlling an imaging device such as that shown in FIGS. 15 and/or 17 including multiple light emitting elements and at least one sensor with a rolling shutter in accordance with an exemplary embodiment. The camera devices of FIGS. 15 and 17 can and sometimes do include the same or similar elements as the camera device of FIG. 1A.

The method of flowchart 1800 can be, and in some embodiments is, performed using a camera device such as the camera 100 of FIG. 1A. The exemplary method starts in step 1802 where the camera is powered on and initialized. Operation proceeds from step 1802 to step 1804. In step

1804 user input setting indicating focal length to be used for image capture is received. In some embodiments the focal length in set by a user via a zoom control input. Operation proceeds to step 1806. In step 1806 user input setting indicating exposure time to be used for image capture is received. The user specified focal length and exposure time for image capture may be stored in the memory as user specified camera configuration settings.

Operation proceeds from step 1806 to steps 1810 and 1812 via connecting node 1808. Steps 1810 and 1812 are performed as part of operating the camera device to capture one or more images. In some embodiments the steps 1810 and 1812 are performed in parallel however, as will be discussed, the rolling shutter timing is used in accordance with the features of some embodiments to control light emitting elements. In step 1810 a rolling shutter is operated to control sequential capture of different image areas by an image sensor to capture an image. In various embodiments the rolling shutter is an electronic shutter that controls reading out of different portions of said image sensor at different times. As indicated by the arrow from box 1810 to 1812, step 1812 uses rolling shutter timing input to control the operations performed in step 1812 in some embodiments.

In step 1812 different light emitting elements in an array of lighting elements included in the plurality of light emitting elements are operated at different times depending on the image area being captured by said image sensor at a particular point in time at different times. Control of the light emitting elements is synchronized with operation of the rolling shutter with the amount of time one or more light emitting elements remain on being a function of the exposure time being used. By selectively controlling which light elements are on at a particular point in time based on rolling shutter operation, power can be conserved as compared to systems which fully illuminate an entire area by keeping all light emitting elements on for the full duration of an image capture process. In various embodiments step 1814 is performed as part of performing step 1812. In step 1814 different sets of light emitting elements in the array are controlled to emit light at different times. In various embodiments the controlling step 1814 includes one or more of steps 1816 through 1826, with step 1816 being optional (as indicated by the dashed line box).

In some embodiments different sets of light emitting elements in the plurality of light emitting elements are covered with different lenses. The lenses may correspond to lenses which may be selected by a user for image capture purposes and which are used as part of the optical chain module or modules of the camera. In some such embodiments step 1816 is performed where it is determined which sets of light emitting elements are to be used based on an effective focal length setting or a lens being used by the imaging device for image capture. In some embodiments the user specified focal length setting (received via user input in step 1804) is checked to determine which sets of light emitting elements are to be used so that the lens used over the light emitting device can be matched or coordinated with the lens or group of lenses used with a sensor to provide proper illuminate of the area which is to be imaged by the sensor.

Operation proceeds to step 1818. In step 1818 it is determined when different sets of the light emitting elements are to be on based on an exposure setting. In some embodiments determining when different sets of the light emitting elements are to be on is further based on an amount of time between read outs of different portions of the sensor, e.g., as controlled by the rolling shutter timing.

Operation proceeds to step 1820. In step 1820 a first set of light emitting elements corresponding to a first image area is operated during a first period of time, determined based on the timing of the rolling shutter, during which a first portion of said sensor is exposed for image capture. In various embodiments operating the first set of light emitting elements corresponding to a first image area during a first period of time includes illuminating the first set of light emitting elements during the first period of time. The duration of the first period of time may be a function of the exposure time. In some embodiments the illumination is performed for the duration of the exposure time while in other embodiments a strobe or other bright light is used during at least a portion of the exposure time but possibly not the full duration of the exposure time.

Operation proceeds to step 1822. In step 1822 a second set of light emitting elements corresponding to a second image area which is different form said first image area is operated during a second period of time, determined based on the timing of said rolling shutter, during which a second portion of said sensor corresponding is being exposed for image capture. In some embodiments the first period of time includes at least a portion of time which does not overlap said second period of time. It should be appreciated that the length of the exposure period may affect whether there is overlap of the first and second period of time with overlap being more likely in cases where there are long exposure times. In some embodiments step 1822 includes performing step 1824 where the second set of light emitting elements is controlled to be off during at least a portion of time included in said first period of time which does not overlap said second period of time. The off period of time of the first set of light emitting elements may correspond to the time period in which the exposure corresponding to the second sensor readout area does not overlap the exposure period associated with the first sensor readout area.

Operation proceeds to step 1826. In step 1826 an Nth set of light emitting elements corresponding to an Nth image area is operated to output light during an Nth time period, the Nth time period being determined based on the timing of the rolling shutter and being a period of time during which an Nth portion of the sensor is exposed for image capture, N being an integer value corresponding to the total number of time periods used by said rolling shutter to complete one full read out of said image sensor. For example, N would be 3 if the rolling shutter corresponded to 3 sensor readouts to fully readout out a sensor. It should be appreciated that in most cases N will be relatively large, e.g., greater than 10 or even greater than a hundred or an even a much larger number.

Operation proceeds to step 1812 to step 1828. In step 1828 the camera device is controlled to capture one or more images based on the received user settings, e.g., exposure and/or focal length settings. Step 1828 may include repeating steps 1810 and 1812 based on the received user settings. The light control process may repeat with the user changing the exposure time and/or focal length setting between each image capture or with the camera device automatically optimizing and adjusting the exposure setting based on lighting and/or other conditions.

Figure 19A:
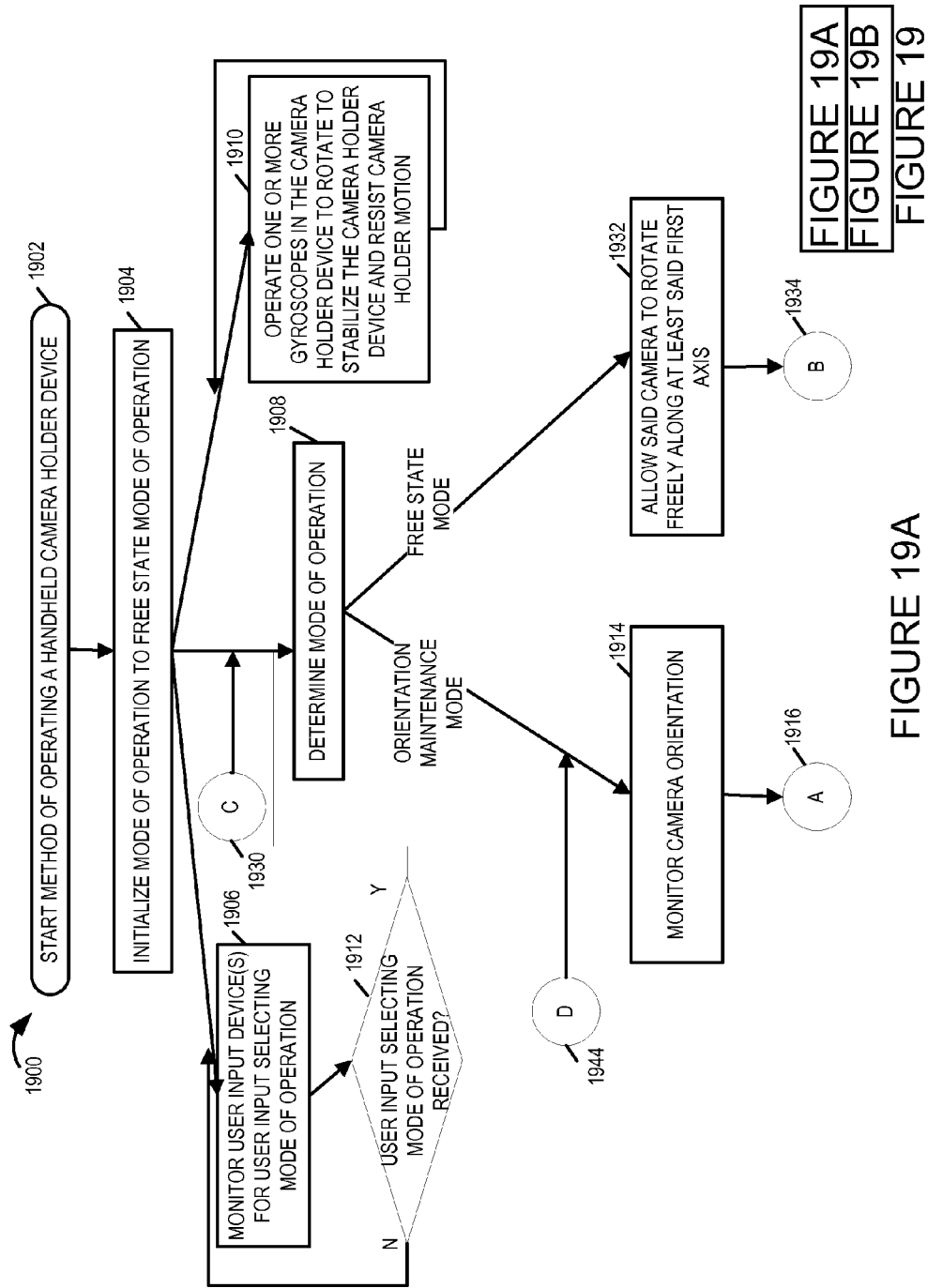
FIG. 19A, which is a first part of FIG. 19, is a flow chart showing a method of operating a handheld camera holder such as the camera holder shown in the other figures of the application.
Figure 19B:
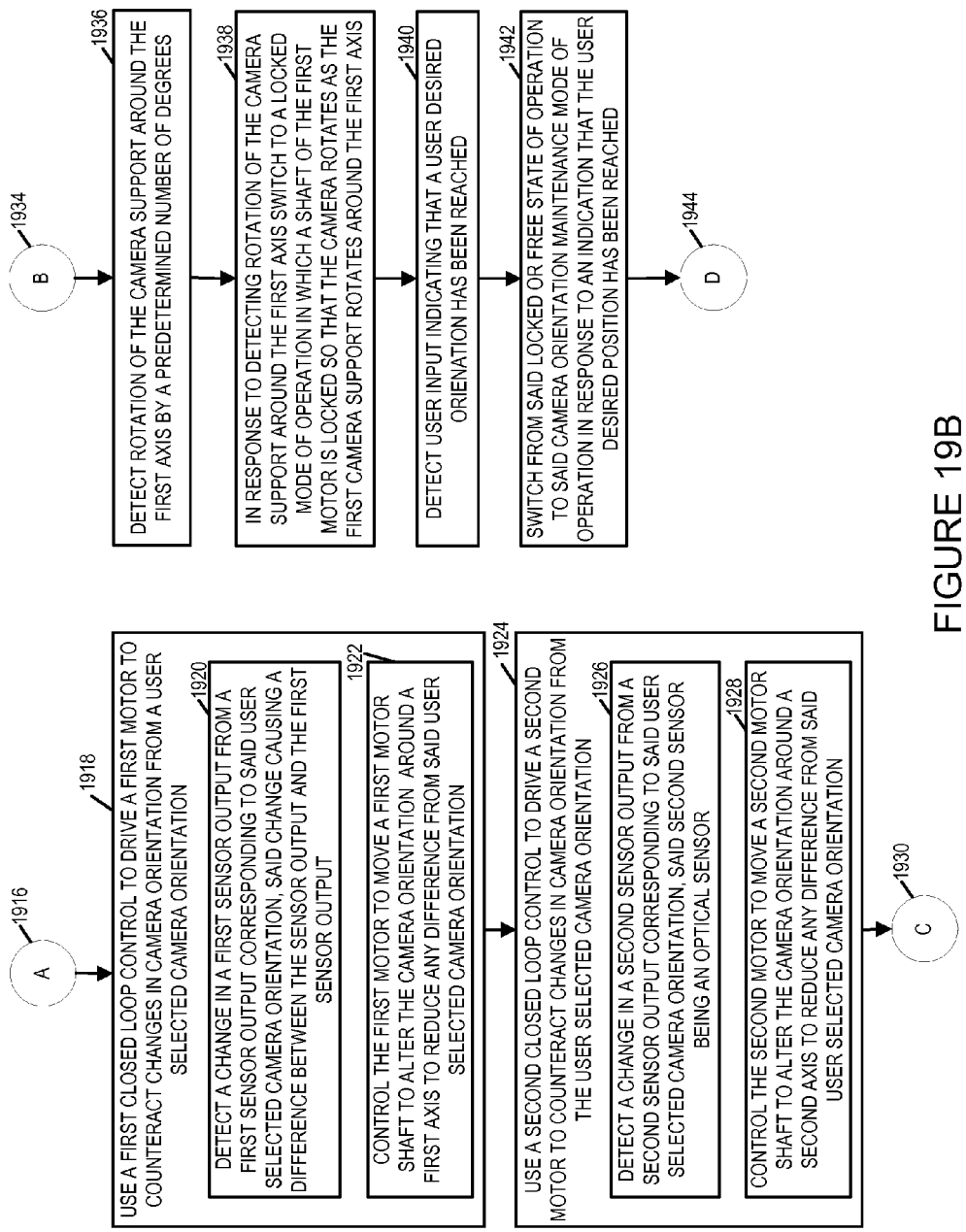
FIG. 19B, which is a second part of FIG. 19, is a second part of the flow chart showing the method of operating a handheld camera holder such as the camera holder shown in the other figures of the application.

FIG. 19, which comprise the combination of FIGS. 19A and 19B, is a a flow chart showing a method of operating a handheld camera holder such as the camera holder shown in any of FIGS. 9 to 13B of the application. The reference number 1000 will be used for the camera holder when discussing FIG. 19.

The method 1900 shown in FIG. 19 begins in start step 1902, e.g., with the camera holder device 1000 being powered on and the camera 100 or any other camera inserted into the holders, e.g., clamps or clips 910, 910 which may be spring loaded to provide sideways pressure on the camera. From start step 1902 operation proceeds to step 1904 in which the camera holder device mode of operation is initialized to a free state mode of operation during which the camera is allowed to move relative to the support fork 902 of the holder 1000. The support fork 902 includes 3 main pieces, the left support arm 903 which is the left vertical portion of the support fork 902, the right support arm 903' which is the right vertical portion of the support fork 903 and a main support member 905 which is the horizontal portion of the support form which connect the right and left support arms 903, 903' and to which the handle 914 is ratably mounted either directly to sharp 919 or via a gear 918 or other rotatable mount.

Operation proceeds after initialization from step 1904 to steps 1906, 1910 and 1908 which may occur in parallel. In step 1906 the camera holder device 1000 montors for user input, e.g., depression of a control button, a touch of a touch sensitive portion of the holder device, etc. indicating a user control input designating a desired holder device mode of operation, e.g., free mode of operation, a camera position maintenance mode of operation or a lock mode of operation. Depressing or indicating a user selection of the maintenance mode of operation is interpreted as an indication that the current camera orientation is the user desired camera orientation. Other user input in the form of a detectable tilt or rotation of the camera handle may also be detected and interpreted in step 1906 as user input indicating a desired mode of operation or user selected camera orientation to be maintained.

In step 1912 a check is made as to whether the monitoring in step 1906 detected user input. If user input selecting a mode of operation was detected, operation proceeds to step 1908 so the user selected mode can be implemented if it is not already being implemented. If no user input is detected in step 1912 operation returns from step 1912 to step 1906 where the process of monitoring for user input continues to be performed on an ongoing basis.

In step 1910, one or more gyroscopes 934 I the holder device 1000 are operated to rotate to stabilize the camera holder device and resist camera holder motion. The gyroscopes 934'. 934" and 934''' are powered by a battery 932 in the holder and thus do not drain the battery in the camera. In some embodiments the gyroscopes include first 934', second 934" and third 934''' gyroscopes which are oriented in different directions and, acting as a triad, provide stabilization of the holder along three perpendicular axis. Thus, by using the gyroscopes 934, stabilization against unintended hand motion is provided and the holder device 1000 is more difficult to turn or move than would be the case if the gyroscopes were not operating. Thus, the gyroscopes 934 provide a level of stabilization independent of sensors and/or other devices in the holder device 1000.

The gyroscopes 934 will continue to operate while a camera is inserted in the holder. The user may, through a user input, power off the gyroscopes 934 but they normally will operate while a camera is inserted into the holder and in use.

In step 1908 the mode of operation of the holder device is determined, e.g., based on user input, motion of the handle 914, and/or some other condition such as the fact that the holder was just powered on and initialized. Depending on the mode of operation to be implemented, operation proceeds from step 1908 to spte 1914 or step 1932. Operation proceeds from step 1908 to step 1914 when the determined mode of operation is a camera orientation maintenance mode of operation. Such a mode is determined to be used when the user has indicated a user preferred camera orientation, e.g., by activating a control, such as a button or touch sensor, on the input indicating user preference for the current camera orientation or via movement of the handle in a particular to indicate a preference that a particular orientation be maintained.

In step 1914 the camera orientation is monitored. This is done, in some embodiments by using output of in the accelerometers 122 included in the camera and/or images captured by one or more optical sensors 127, 251 and/or 139 to determine camera orientation, e.g., tilt relative to a first axis 1302 and rotation around a second axis 1304. The output of the accelerometer sensors included in accelerometer module 122 and/or image or angle information obtained based on the images captured by the optical sensors can be communicated between the camera 100 and devices in the holder device 1000 via interface 999 which may be a wired or wireless interface. Thus, the holder device can receive and use camera orientation information available from the camera device 100 to support closed loop position control around one or both of the first and second axis. As should be appreciated while two axis stabilization is shown and described in some embodiments the methods used herein are used to provide three axis stabilization of a hand held camera holder.

With the current camera orientation determined in step 1914 operation proceeds via connecting step 1916 to step 1918. In step 1918 a first closed loop control circuit 901 is used to drive a first motor 912 to counteract changes in camera orientation where the changes are used to a user selected camera orientation. While the first closed loop control circuit 901 is used to control the first motor 912 it or another control circuit can be used to control the additional motor 912' so that in embodiments where two motors are used along the first axis they are control to act in combination to more the camera 100 as needed to adjust the position of the camera 100 around the first axis to maintain or minimize any change from the user selected camera orientation. Step 1918 includes step 1920 in which the first closed loop control 901 detects a change in a first sensor output from a first sensor output corresponding to said user selected camera position. In some embodiments one or more accelerometers in the camera 100 are used as the first sensor while in other embodiments an optical sensor, e.g., a camera image sensor is used as the first sensor. The detection step may be implemented by the processor 951 included in the first closed loop control circuit 901. In step 1922 the first motor 912 is controlled, e.g., by the processor 951, to move a first shift 911 of alter the camera orientation around the first axis to reduce any difference from said user selected camera orientation. This can be done by treating the output of the first sensor when the camera was at the desired orientation as a reference level or reference frame and then driving the first motor 912 to minimize the difference from the reference sensor level output or reference frame. In controlling the camera motion the first closed loop control circuit 901 may use rotational information from rotational sensor 913 or 913' to detect rotation around the first axis and to determine the amount of current or time the first motor 912 should be driven to complete a change in camera orientation which is estimated to be needed to be made based on the output of the accelerometers in the camera and/or image sensor.

Operation proceeds from step 1918 to step 1924 in which closed loop control with respect to the second axis 1304 is implemented. The operation of step 1924 is similar to that of step 1918. However, in step 1924 in some embodiments the optical sensor is used to determine the amount of camera rotation to be used. This is particularly the case when the camera is oriented in the vertical direction making use of accelerometers to determine the rotational position around the second axis difficult or impractical to determine the orientation around the second axis 1304. Thus, in some embodiments while accelerometer outputs from the camera 100 are used to control orientation around the first axis optical outputs are used to control stabilization of the orientation around the second axis. In some embodiments optical sensor output is used to control stabilization of orientation around both the first and second axis alone or in combination with accelerometer sensor outputs.

In step 1924 a second closed loop control circuit is used to drive a second motor 930 to counteract changes in camera orientation from the user selected camera orientation. Step 1924 includes step 1926 in which a change in the second sensor output from the user selected camera orientation is detected. In some but not all embodiments the second sensor is an optical sensor or a combination of optical sensor. Thus, by detecting a difference between the output of the second sensor given the current camera orientation relative to the reference output of the second sensor when the camera was in the user desired orientation, a change in camera orientation can be detected and used to control rotation around the second axis 1304 to counteract the change.

From step 1926 operation proceeds to step 1926 of step 1924. In step 1928 the second motor 930 is controlled to move a second motor shaft 931 to alter the camera orientation around the second axis 1304 to reduce any difference from the user selected camera orientation. Steps 1926 and 1928 may be implemented by the processor 953 included in the second closed loop control circuit 907. While separate processors 951, 953 are shown in the first and second closed loop control circuits 901, 907 the processors could be the same and/or the processor 936 can serve as the processors of the closed loop control circuits 901, 904 while also performing other camera holder functions. Rotational information provided by rotational sensor 919 may be taken into consideration by the second closed loop control circuit 907 when determining how long to power the second motor 930 to achieve a desired change in orientation. For example bases on a measure rotation after applying power to the motor for a first period of time, the processor in the second closed loop control circuit can estimate how long the second motor 930 should be powered to achieve what the processor 953 estimates to be a needed amount of rotation to restore the camera orientation with respect to the second axis to the user selected orientation.

Operation proceeds from step 1924 to step 1908 via connecting node 1930. Thus, while the camera holder device continues to operate in the orientation maintenance mode of operation the camera orientation will continually be updated to compensate for hand motion induced changes in camera orientation associated with changes in holder position due to hand movements.

Operation which is performed when step 1908 determines that a free state mode of operation is to be implemented will now be discussed. This state occurs, for example, when a user has not indicated a preferred camera orientation such as when the camera holder is initially powered. In step 1932, in the free mode of operation the motors 912, 912' and 930 are not powered and the shafts of the motors and thus the camera 100 in the holder 910, 910' can rotate freely around the first and second axis. This allows the user to orient the camera as desired, e.g., by manual moving the camera with one hand while the camera holder is held by the other hand. Operation proceeds from step 1932 to step 1936 via connecting node 1934.

In step 1936 rotation of a camera support such as one of the first and second support arms 903, 903' or support member 905 and/or handle 914 around the first axis 1302 is detected. This may be done using the output of one or more accelerometers ACC 997 in the handle 914 or via other means such as using a rotational sensor 913 or 913'. Operation proceeds from step 1936 to step 1938 where in response to detecting rotation of the camera support and/or handle around the first axis beyond a predetermined amount, the camera holder device mode of operation is switched to a locked mode of operation so that as the camera support or handle rotates beyond the predetermined amount around the first axis, the camera will rotate with the movement of the support/handle.

It should be noted that step 1938 may be skipped and operation proceed directly to step 1940 while, in the free state of operation, the user indicates that a desired camera orientation has been achieved.

In step 1940 the camera holder device 1000, e.g. the processor 936 in the camera holder device detects user input indicating that a user desired camera orientation has been reached. This indication may be in the form of the user pressing a button, touching a touch sensor or altering the camera handle position, e.g., rotating it back slightly from the position that was reached to indicate that the position that was reached is the user desired position and that changes in the orientation should be stopped.

In response to detecting the user input in step 1940 indicating a desired position has been reached, in step 1942 the camera holder device switches from the locked or free state of operation to the camera orientation maintenance mode of operation so that the user selected camera orientation can be automatically maintained. Operation proceeds from step 1942 back to step 1908 via connecting node 1944 so that operation in the set mode of operation can proceed.

From the above it should be appreciated that various embodiments are directed to methods and apparatus for stabilizing a camera using a camera holder which is intended to be held in a hand are described. When mounted in the holder, the camera is secured in the holder and at least two axis of rotation of the camera holder pass through the center of mass of the camera. Given such a mounting arrangement the camera does not have a tendency to rotate due to gravity when in a substantially upright forward facing position. Furthermore, aligning axis of rotation with the center of mass allowing the camera to be maintained in a variety of positions with little or no power as gravity causes little or no torque. Generally, in such an embodiment, the torque on the camera is due to the forces of friction as the holder itself rotates and/or as applied by motors as part of the stabilization process to maintain a particular, e.g., user selected, camera orientation. To stabilize such a camera motors, e.g., relatively small motors, can be used to provide the small amount of torque needed to maintain the camera in the desired position.

Camera orientation stabilization is performed during one mode of operation, e.g., an orientation maintenance mode of operation, based on information from an accelerometer in the camera and/or an optical sensor, e.g., the camera image sensor. The accelerometer output and/or camera image output is used to detect changes from a user selected camera orientation, and closed loop control use one or more motors and the sensor is used to reduce or eliminate the difference between the detected camera orientation and the user selected camera orientation.

Consider a desired, e.g., user selected camera position, which is used as a reference position to be maintained. The holder provides camera rotation stabilization of the camera so that while the hand holding the camera holder may move the camera does not significantly rotate along either of the two axis of rotation due to the closed loop feedback control of the motors corresponding to each of the axis which drive, under closed loop control, the position of the camera in a manner which counteracts changes due to movement of a hand holding the camera holder. Thus, during the orientation maintenance mode of operation using closed loop controls, e.g., based on processor control and output of an accelerometer and/or image sensor, control one or motors to counteract handle motion and maintain the camera orientation at the user selected orientation.

During a free state of operation, closed loop orientation control may not be used. The camera may be allowed to move freely with respect to one or both axis of the holder. During such an embodiment, the holder provides camera rotation stabilization up until a point, e.g., +/−20 degree or +/−30 degrees holder rotation relative to the camera. The position of the camera to the handle is monitored in the free state of operation. When the handle moves beyond the predetermined amount the mounting shafts corresponding to the axis on which the rotation behind the predetermined amount will be locked under processor control allowing the user to rotate or tilt the camera to a new desired position. For example, if the user rotated the camera 22 degrees along an axis, and the maximum stabilization was +/−20 degree difference for the axis until locked-up, the camera would rotate 2 degrees around the axis since it was moved 2 degrees after lock up. Once in the desired position the user may indicate, e.g. by pressing a button or taking another action, that the position that was reached should be used as a reference position and that the camera should enter the camera orientation stabilization mode of operation.

The camera will be stabilized at the new angle and/or direction reached by rotating the camera beyond the maximum stabilization. Assuming the user then indicated that the desired position had been reached by pressing a button or a touch input or in some but not all embodiments by rotating the holder in the opposite direction, the camera would be maintained at the two degree position while in the orientation stabilization mode of operation.

The user may switch from the orientation stabilization mode of operation or to one or more locked axis modes of operation by button control, touch control or other user input used to switch to one of a plurality of mode of operation. User selectable modes of operation include a free mode of operation in which neither the first or second axis are stabilized, a first locked mode of operation in which movement of the camera relative to the first axis is locked so that the camera moves as the camera holder handle moves relative to the first axis, a second locked mode of operation in which movement of the camera relative to the second axis is locked so that the camera moves as the camera holder handle moves relative to the second axis, a third locked mode of operation in which movement of the camera relative to both the first and second axis is locked so that the camera moves as the camera holder handle moves relative to the first and second axis.

The camera holder may include additional lighting (flash), memory and/or a battery for powering the camera or providing added illumination in some embodiments. It may also include some buttons such as trigger to take pictures. Communication between the camera and holder may be wireless avoiding the need for a wired interface to the camera while in the holder although a wired interconnect via camera mount points is also possible. Thus, the camera holder can communicate with the camera wirelessly or via a wired connection to receive camera position/orientation information from the sensors included in the camera.

The camera holder of the present invention is particularly well suited for use in combination with multi-optical chain cameras of the type described in the present application but can be used with other cameras as well. In conventional cameras which support optical zoom the center of mass of the camera normally moves as a function of zoom as the (heavy) lens of the conventional camera is moved in or out to support the zoom function. Such changes in lens position in a conventional camera normally change the center of mass of the camera in a significant way. This makes it difficult to ensure that the axes or rotation pass through the center of mass for all zoom positions. In at least some embodiments of the present invention where cameras with multiple optical chains are used, the center of mass may not and in at least some embodiments does not, significantly change in response to zoom control. This is because the camera device can implement zoom without having to move a heavy lens beyond the front face of the camera housing. Given that the camera of the present invention has a fixed center of mass which does not change with zoom control, it is easy to ensure that the axes of rotation pass through the center of mass independent of the zoom level. Hence the multi-optical chain camera of the present invention is particularly well suited for the camera holder which is shown and described.

Once particular exemplary embodiment is directed to a camera holder device (1000) for holding a camera (100), the camera holder including a first support arm (903) supporting a first camera holder (910) for holding a first side of the camera (100); a second support arm (903') supporting a second camera holder (910') for holding a second side of the camera (100); a first motor (912) mounted in said first support arm (903) and coupled to said first camera holder (910); a first closed loop control (901) to drive a first motor (912) to counteract changes in camera orientation from a user selected camera orientation while said camera holder device (1000) is operating in a orientation maintenance mode of operation. The camera holder device in some embodiments further includes a handle (914) connected to said support arms (903, 903'), said handle (914) including at least one gyroscope (934) for stabilizing said handle (914), a second motor (930) coupled to a lower support member (905) which in combination with said first and second support arms (903, 903') form a camera support fork (902); and a second closed loop control (907) to drive the second motor (930) to counteract changes in camera orientation from the user selected camera orientation. The first closed loop control (901) is configured in some embodiments to detect a change in a first sensor output from a first sensor (124 or 127) corresponding to said user selected camera orientation, said change causing a difference between a current sensor output of the first sensor (124 or 127) and the first sensor output; and control the first motor (912) to move a first motor shaft (911) to alter the camera orientation around a first axis (1302) to reduce any difference from said user selected camera orientation. In some embodiments the first sensor is an accelerometer (124) in said camera (100) which provides information indicative of a camera tilt angle while in other embodiments the first sensor is an optical sensor (127) in said camera (100). In some embodiments the second closed loop control (907) controls the second motor (930) to move a second motor shaft (931) to alter the camera orientation around a second axis (1304) to reduce any difference from said user selected camera orientation. In some embodiments the second motor shaft (931) is aligned with a second axis (1304) which passes through a center of mass of said camera (100) when said camera (100) is mounted in said camera holder device (1000). In various embodiments the camera holder includes a plurality of gyroscopes (934) in said camera holder device (1000) to rotate to stabilize the camera holder device (1000) and resist camera holder motion.

In some embodiments during a free state mode of operation, the processor (936) is configured to allow said camera, handle and/or support structure to rotate freely along at least said first axis (1302). A sensor (919) or at least one accelerometer (997) is included in some embodiments in the handle (914) to detect rotation of the handle and/or another support structure attached to the handle around the first axis. The camera holder device 1000 in some embodiments includes a processor (936) is configured to detect, based on the output of the rotational sensor (919) or the output of the at least one accelerometer (997) in the handle (914), rotation of the handle (914) by a predetermined number of degrees around the first (1302) or second axis (1304); and in response to detecting rotation of the handle (914) around the first (1302) or second axis (1304) by the predetermined number of degrees, switch to a locked mode of operation in which a shaft (911) of the first motor (912) or a shaft (931) of the second motor (930) is locked.

Various features are directed toa method of operating a handheld camera holder device (907) for holding and stabilizing a camera (702). The method in one exemplary embodiment comprises, during an orientation maintenance mode of operation, monitoring camera orientation; and using a first closed loop control to drive a first motor to counteract changes in camera orientation from a user selected camera orientation.

Using a first closed loop control to drive at least one motor includes, in some embodiments, detecting a change in a first sensor output from a first sensor output corresponding to said user selected camera orientation, said change causing a difference between the sensor output and the first sensor output; and controlling the first motor to move a first motor shaft to alter the camera orientation around a first axis to reduce any difference from said user selected camera orientation. In some implementations the first motor shaft is aligned with a first axis which passes through a center of mass of said camera when said camera is mounted in said camera holder device.

The first sensor is, in some embodiments an accelerometer in said camera that provides information indicative of a camera tilt angle. In other embodiments the first sensor is an optical sensor in said camera.

In some embodiments, during the orientation maintenance state of operation a second closed loop control is used to drive a second motor to counteract changes in camera orientation from the user selected camera orientation. Using the second closed loop control to drive at least a second motor includes, in some embodiments, controlling the second motor to move a second motor shaft to alter the camera orientation around a second axis to reduce any difference from said user selected camera orientation. Using a first closed loop control to drive at least one motor, in some embodiments, includes detecting a change in a first sensor output from a first sensor output corresponding to said user selected camera orientation, said change causing a difference between the sensor output and the first sensor output, said first sensor being an accelerometer; and controlling the first motor to move a first motor shaft to alter the camera orientation around a first axis to reduce any difference from said user selected camera orientation. In some implementations using a second closed loop control to drive a second motor includes detecting a change in a second sensor output from a second sensor output corresponding to said user selected camera orientation, said second sensor being an optical sensor; and controlling the second motor to move a second motor shaft to alter the camera orientation around a second axis to reduce any difference from said user selected camera orientation.

In some implementations, the second motor shaft is aligned with a second axis which passes through a center of mass of said camera when said camera is mounted in said camera holder device. Operating the camera holder device includes operating one or more gyroscopes (934), e.g., three gyroscopes at different angles relative to each other, in said camera holder device to rotate to stabilize the camera holder device and resist camera holder motion.

In some embodiments during a free state of operation the camera is allowed to rotate freely along at least said first axis. In one such embodiment the method includes detecting, based on the output of a sensor e.g., rotational sensor and/or accelerometer, rotation of a camera support (903') and/or handle around the first axis by a predetermined number of degrees; and in response to detecting rotation of the camera support around the first axis switching to a locked mode of operation in which a shaft of the first motor is locked so that the camera rotates as the first camera support rotates around the first axis.

In some embodiments the method includes detecting user input indicating that a user desired position has been reached; and switching from a free mode of operation or a locked mode of operation to said camera orientation maintenance mode of operation in response to an indication that the user desired orientation has been reached. In some embodiment the indication is a user activation of an input device used to indicate that the camera is at a user desired position or a movement that indicated that the user desired position has been reached.

The techniques of various embodiments may be implemented using software, hardware and/or a combination of software and hardware. Various embodiments are directed to apparatus, e.g., a camera device, an image processing device or a system. Various embodiments are also directed to methods, e.g., a method of generating combined pixel values from sets of input pixel values corresponding to an image area where each set of pixel values may be provided by a different optical chain module. Various embodiments are also directed to machine, e.g., computer, readable medium, e.g., ROM, RAM, CDs, hard discs, etc., which include machine readable instructions for controlling a machine, e.g., camera device, processor or image processing system, to implement one or more steps of one or more of the methods described in the present application.

In various embodiments apparatus described herein are implemented using one or more modules to perform the steps corresponding to one or more methods. Thus, in some embodiments various features are implemented using modules. Such modules may be implemented using software, hardware or a combination of software and hardware. Optical chain modules as should be appreciated include as least some hardware elements such as an image sensor and are therefore normally not implementable purely in software while other modules may be implemented fully in software. In some embodiments in which the modules are implemented in hardware, the modules are implemented as circuits, e.g., of a processor and/or as a combination of hardware elements such as lenses, filters and an image sensor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a camera device, an image processing device or other type of system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software. Numerous additional variations on the methods and apparatus of the various embodiments described above will be apparent to those skilled in the art in view of the above description. Such variations are to be considered within the scope of the invention.

What is claimed is:

1. A method of controlling a camera, the method comprising:
   detecting camera acceleration;
   detecting user activation of one of: i) a zoom control user input used to enable an acceleration based zoom control mode of operation, ii) a focus control user input used to enable an acceleration based focus control mode of operation or iii) concurrent activation of both the zoom control user input and the focus control user input;
   enabling one of the acceleration based zoom control mode of operation or the acceleration based focus control mode of operation based on the detected user activation of one of: i) the zoom control user input used to enable an acceleration based zoom control mode of operation, ii) the focus control user input used to enable an acceleration based focus control mode of operation or iii) concurrent activation of both the zoom control user input and the focus control user input was detected;
   controlling the camera device to not accept user input attempting to enable the acceleration based focus control mode of operation when the acceleration based zoom control mode of operation is enabled thereby keeping the zoom control mode of operation enabled despite user activation of the focus control user input; and
   performing a focus operation as a function of the detected camera acceleration when the acceleration based focus control mode of operation is enabled.

2. The method of claim 1, wherein performing the focus operation includes performing a focus adjustment operation which decreases the back focal distance of the camera when the detected acceleration is indicative of a forward camera motion.

3. The method of claim 1, wherein enabling one of the acceleration based zoom control mode of operation or the acceleration based focus control mode of operation includes:
   operating the camera to enable the zoom control mode of operation in response to detecting concurrent activation of both the zoom control user input and the focus control user input.

4. The method of claim 3, further comprising:
   storing information indicating the state of the zoom control user input used for controlling the zoom control function; and
   storing information indicating the state of the focus control user input used for controlling the focus control function.

5. The method of claim 3, wherein said zoom control user input is a first touch sensor and said focus control user input is a second touch sensor.

6. The method of claim 5, wherein said first and second touch sensors are touch sensors of a handle of a camera holder into which said camera is inserted.

7. The method of claim 3, wherein said zoom control user input is a first button on a camera holder into which said camera is inserted and a second touch sensor is a second button on the camera holder.

8. A camera system, comprising:
   a zoom control user input;
   a focus control user input; and
   a camera including:
      an accelerometer configured to detect camera acceleration; and
      a processor configured to:
      detect user activation of one of: i) the zoom control user input used to enable an acceleration based zoom control mode of operation, ii) the focus control user input used to enable an acceleration based focus control mode of operation or iii) concurrent activation of both the zoom control user input and the focus control user input;
      enable one of the acceleration based zoom control mode of operation or the acceleration based focus control mode of operation based on the detected user activation of one of: i) the zoom control user input used to enable an acceleration based zoom control mode of operation, ii) the focus control user input used to enable an acceleration based focus control mode of operation or iii) concurrent activation of both the zoom control user input and the focus control user input was detected;
      control the camera device to not accept user input attempting to enable the acceleration based focus control mode of operation when the acceleration based zoom control mode of operation is enabled thereby keeping the zoom control mode of operation enabled despite user activation of the focus control user input; and
      control the camera to perform a focus operation as a function of detected camera acceleration.

9. The camera system of claim 8, wherein said processor controls the camera to decrease camera back focal distance when the detected acceleration is indicative of a forward camera motion.

10. The camera system of claim 8, wherein the processor is configured to control the camera, as part of enabling one of the acceleration based zoom control mode of operation or the acceleration based focus control mode of operation, to:
   enable the zoom control mode of operation in response to detecting concurrent activation of both the zoom control user input and the focus control user input.

11. The camera system of claim 10, wherein said zoom control user input is a first button on a camera holder into which said camera is inserted and a second touch sensor is a second button on the camera holder.

12. The camera system of claim 10, wherein said zoom control user input is a first touch sensor and said focus control user input is a second touch sensor.

13. The camera system of claim 12, wherein said first and second touch sensors are touch sensors of a handle of a camera holder into which said camera is inserted.

14. The camera system of claim 8, further comprising:
   a register storing information indicating the state of the zoom control user input used for controlling the zoom control function; and
   a register storing information indicating the state of the focus control user input used for controlling the focus control function.

\* \* \* \* \*